(12) United States Patent
Ge et al.

(10) Patent No.: US 8,334,955 B2
(45) Date of Patent: Dec. 18, 2012

(54) LIQUID CRYSTAL DISPLAY DEVICE HAVING PATTERNED ELECTRODES FOR REPETITIVE DIVIDED HORIZONTAL ELECTRIC FIELD AND FRINGING ELECTRIC FIELD

(75) Inventors: Zhibing Ge, Orlando, FL (US); Xinyu Zhu, Orlando, FL (US); Shin-Tson Wu, Oviedo, FL (US); Thomas Xinzhang Wu, Oviedo, FL (US)

(73) Assignees: University of Central Florida Research Foundation, Inc., Orlando, FL (US); Toppoly Optoelectronics Corp., Miao-Li County (TW)

( * ) Notice: Subject to any disclaimer, the term of this patent is extended or adjusted under 35 U.S.C. 154(b) by 195 days.

(21) Appl. No.: 12/771,733

(22) Filed: Apr. 30, 2010

(65) Prior Publication Data

US 2010/0271583 A1   Oct. 28, 2010

Related U.S. Application Data

(62) Division of application No. 11/286,810, filed on Nov. 23, 2005, now Pat. No. 7,932,980.

(51) Int. Cl.
| | |
|---|---|
| G02F 1/136 | (2006.01) |
| G02F 1/1335 | (2006.01) |
| G02F 1/1337 | (2006.01) |
| G02F 1/1343 | (2006.01) |
| G02F 1/13 | (2006.01) |
| H01J 9/24 | (2006.01) |

(52) U.S. Cl. ............ 349/141; 349/42; 349/96; 349/123; 349/187; 445/24

(58) Field of Classification Search .............. 349/42, 349/96, 123, 141, 187; 445/24
See application file for complete search history.

(56) References Cited

U.S. PATENT DOCUMENTS

| | | | |
|---|---|---|---|
| 5,598,285 | A | 1/1997 | Kondo |
| 6,233,034 | B1 | 5/2001 | Lee |
| 6,396,556 | B1 | 5/2002 | Watanabe |
| 6,801,293 | B1 | 10/2004 | Nishiyama |
| 6,924,863 | B2 | 8/2005 | Nishida |

(Continued)

OTHER PUBLICATIONS

Yukito, et al., Optimum Film Compensation of Viewing Angle of Contrast in In-Plane-Switching-Mode Liquid Crystal Display, Jpn. J. Appl. Pys., 1998, pp. 4822-4828, vol. 37, part 1, No. 9A.

(Continued)

*Primary Examiner* — Jerry Blevins
(74) *Attorney, Agent, or Firm* — Brian S. Steinberger; Phyllis K. Wood; Law Offices of Brian S. Steinberger, P.A.

(57) ABSTRACT

Apparatus, methods, systems and devices for high aperture ratio, high transmittance, and wide viewing angle liquid crystal display having first and second substrates each with an alignment layer and polarizer on the interior and exterior surface thereof and a liquid crystal material therebetween forming plural pixels each having a common electrode group and a pixel electrode group each having at least one common and pixel electrode. A fringe field drives the molecules in the regions above and below the electrodes and a horizontal field drives the molecules between the electrode groups to achieve high transmittance. In an embodiment an insulating layer separates the substrate and alignment layer and the pixel electrodes are on the substrate and the common electrodes are on the insulating layer. In another embodiment a compensation film is layered between one of the substrates and corresponding polarizer.

24 Claims, 24 Drawing Sheets

U.S. PATENT DOCUMENTS 7,460,198 B2 12/2008 Nagai
2005/0094043 A1* 5/2005 Inoue et al. .................. 349/34

OTHER PUBLICATIONS

Takeda, et al., 41.1: A Super-High Image Quality Multi-Domain Vertical Alignment LCD by New Rubbing-Less Technology, SID, 1998.

Kyeong, et al., 21.4: Domain Divided Vertical Alignment Mode with Optimized Fringe Field Effect, ASID, 1998.

Chen, et al., 21.2: Optimum Film Compensation Modes for TN and VA LCDs, SID, 1998.

Mori, et al., 38.4L: Late-News Paper: Novel Optical Compensation Film for AMLCDs Using a Discotic Compound, SID, 1997.

* cited by examiner

Prior Art

LIQUID CRYSTAL DISPLAY DEVICE HAVING PATTERNED ELECTRODES FOR REPETITIVE DIVIDED HORIZONTAL ELECTRIC FIELD AND FRINGING ELECTRIC FIELD

This application is a divisional application of co-pending U.S. patent application Ser. No. 11/286,810 filed on Nov. 23, 2005.

FIELD OF THE INVENTION

The present invention is related to liquid crystal displays, and more particularly to a apparatus, methods, systems and devices for a high aperture ratio, high transmittance, and wide viewing angle liquid crystal display device driven by groups of electrodes in each pixel area that is useful for high-definition televisions and monitors which require high brightness and large viewing angle performance.

BACKGROUND AND PRIOR ART

Generally, based on the on-state orientation scheme of liquid crystal major axis, the direction of the axis is referred to as directors, there are two primary types of liquid crystal displays LCDs. The first type of LCD has directors that rotate mainly in a plane orthogonal to a substrate and the second type has directors rotating mainly in a plane parallel to the substrate.

The most typical mode of the first category is the twisted nematic liquid crystal display TN LCDs, in which the electrodes are configured on both of the two substrates. The TN LCD is usually arranged to be twisted at an angle of 90 degrees and shows high transmittance, low power consumption, and easy fabrication. However, the TN LCD exhibits a narrow viewing angle because its liquid crystal directors on the two substrate surfaces are perpendicularly aligned to each other.

Various methods have been disclosed to solve the problem of the narrow viewing angle in typical LCD devices. One effective way of solving the problem is the introduction of multi-domain structures in the LCD devices. However, multi-domain in TN typed LCDs such as the two or four-domain TN LCDs are limited in improving the viewing angle to achieve a contrast ratio approximately >10:1 confined in a viewing cone at approximately 35 degrees.

Film compensation is another effective method to enhance the viewing angle of TN-LCDs. The major breakthrough was made by Fuji Photo Film Co., which used discotic liquid crystals as a wide viewing film to compensate the dark state of TN LCDs as described in Mori et al, Late-News Paper: Novel Optical Compensation Film for AMLCDs Using Discotic Compound, SID (1997), pp. 941-944. The viewing angles of TN LCD with wide viewing film could be expanded the 10:1 contrast ratio cone to approximately 60 degrees. However, a 60-degree viewing angle is inadequate for large LCD TVs and monitors, especially for solving the problem of non-uniform gray scale at larger viewing angle.

Other display modes for the twisted nematic LCDs, in which the liquid crystal directors mainly rotate in the plane perpendicular to the substrates, for solving the wide-viewing angle problem include the film-compensated multi-domain vertical alignment described in Takeda et al, A Super-High Image Quality Multi-Domain Vertical Alignment LCD by New Rubbing-Less Technology, SID (1998) p. 1077, and patterned vertical alignment mode described in Kim et al, Domain Divided Vertical Alignment Mode with Optimized Fringe Field Effect, ASID (1998) p. 383 liquid crystal display mode. Each has advantages and disadvantages, however problems still exist. Usually negative liquid crystal materials are preferred in the modes just described and they require complex fabrication methods such as protrusion in multi-domain vertical alignment.

Besides the above-mentioned approaches, another effective solution for wide viewing angle problem is to replace TN LCDs with in-plane switching mode LCD devices as described in U.S. Pat. No. 5,598,285 issued to Kondo et al on Jan. 28, 1997. The in-plane switching typed LCDs belong to the second category in which the electrodes are configured on the same substrate and LC directors mainly twist in a horizontal plane as shown in FIG. 1a. The viewing angle characteristic is improved as the liquid crystal directors in the voltage-off state are horizontally aligned, or aligned in parallel to the substrates. With this liquid crystal director distribution, the viewing angle is less azimuthally dependent and wider and can attain approximately a 10:1 contrast ratio at approximately 60 degrees without use of compensation film and the viewing angle is more symmetrical than that of the TN LCDs. Therefore, the in-plane switching mode LCD is more popular than the twisted nematic LCD.

However, in-plane switching mode LCDs also have limitations. FIG. 1a is a schematic of the structure of a prior art in-plane switching LCD having a first and second substrate 101a and 101b, respectively and a liquid crystal layer 104 disposed between the first and second substrates 101a and 101b. The common electrode 102 and pixel electrode 103 in the in-plane switching LCD are often made of opaque metals such as aluminum which blocks the light above the pixel electrode 102 and common electrode 103 regions. FIG. 1a also shows the corresponding transmittance curve versus position in the prior art IPS LCDs with opaque electrodes. As shown, there are two dark zones where the transmittance is approximately zero above the surface of the pixel and common electrodes 102 and 103, respectively. As a result, the aperture ratio and the transmittance in EPS mode are usually low when compared to the TN LCDs. In order to improve the transmittance, U.S. Pat. No. 6,924,863 issued to Nishida et al. issued to on Aug. 2, 2005, disclosed common electrodes and the pixel electrodes that are composed of transparent material such as indium tin oxide (ITO).

Therefore, a need exists for a display mode that combines the wide viewing angle of the in-plane switching LCDs with the high transmittance of the twisted nematic LCDs.

SUMMARY OF THE INVENTION

A primary objective of the invention is to provide new methods, systems, apparatus and devices for a liquid crystal display device in which the electrodes are designed to provide a high aperture ratio, high transmittance and a wide viewing angle.

A secondary objective of the invention is to provide new methods, systems, apparatus and devices for a liquid crystal display device that has the wide viewing angle of the in-plane switching mode liquid crystal display and high transmittance comparable to the twisted nematic liquid crystal displays.

A third objective of the invention is to provide new methods, systems, apparatus and devices for maintaining a high storage capacitance by including an additional pixel auxiliary electrode that occupies a small ratio of the transparent area to increase the aperture ratio and transmittance of the liquid crystal display.

A liquid crystal display including a first and second substrate having plural pixels defined therebetween. The first and second substrates have polarizing layer on an exterior surface and an alignment layer on an inner surface and a liquid crystal layer sandwiched between the first and second alignment layer, the liquid crystal layer treated so that liquid crystal molecules are aligned parallel to the surfaces of the first and second substrate in the absence of applied electric fields. Each of the plural pixels includes a first and second group of electrodes each having at least one common electrode and at least one pixel electrode and a thin-film transistor formed on each pixel to generate a substantially fringing electric field containing both horizontal and vertical electric field components within a region above and below the first group of electrodes and a substantially fringing electric field containing both horizontal and vertical electric field components is generated within the regions above and below the second group of electrodes and a substantially horizontal electric field is generated within the regions of the liquid crystal layer between the first and second group electrodes.

In an embodiment, the liquid crystal display includes an insulating layer between the substrate and the alignment layer and the common electrodes are on the substrate and the pixel electrodes are on the insulating layer. In yet another embodiment, at least one phase retardation film is layered between one of the substrates and the corresponding one of the polarizing layers to improve the viewing angle.

Further objects and advantages of this invention will be apparent from the following detailed description of preferred embodiments which are illustrated schematically in the accompanying drawings.

DESCRIPTION OF THE PREFERRED EMBODIMENTS

Figure 1A:
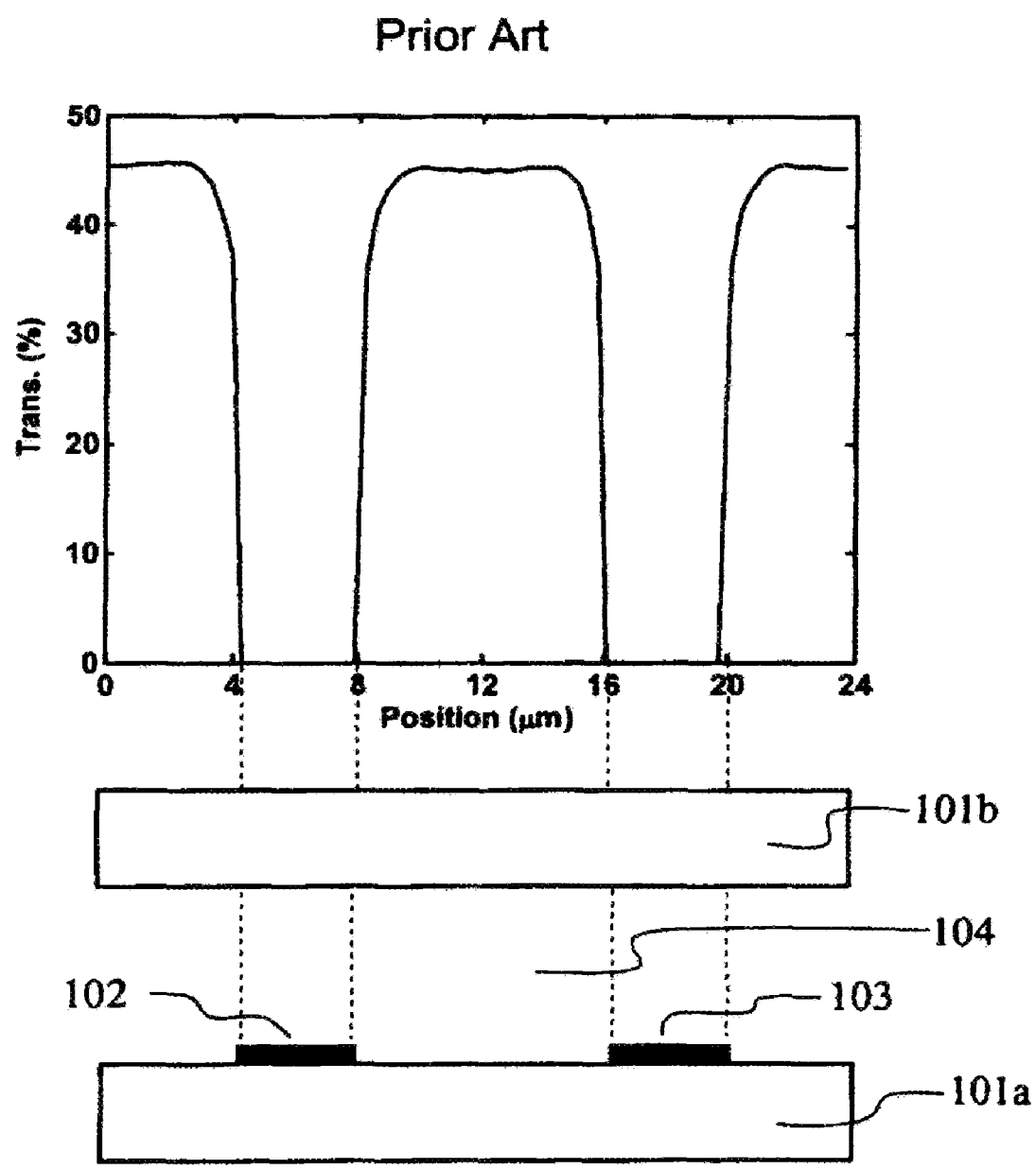
FIG. 1a is a schematic of a prior art in-plane switching LCD structure with opaque electrodes and the transmittance curve versus position under crossed-polarizers corresponding to the in-plane switching LCD structure.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1B:
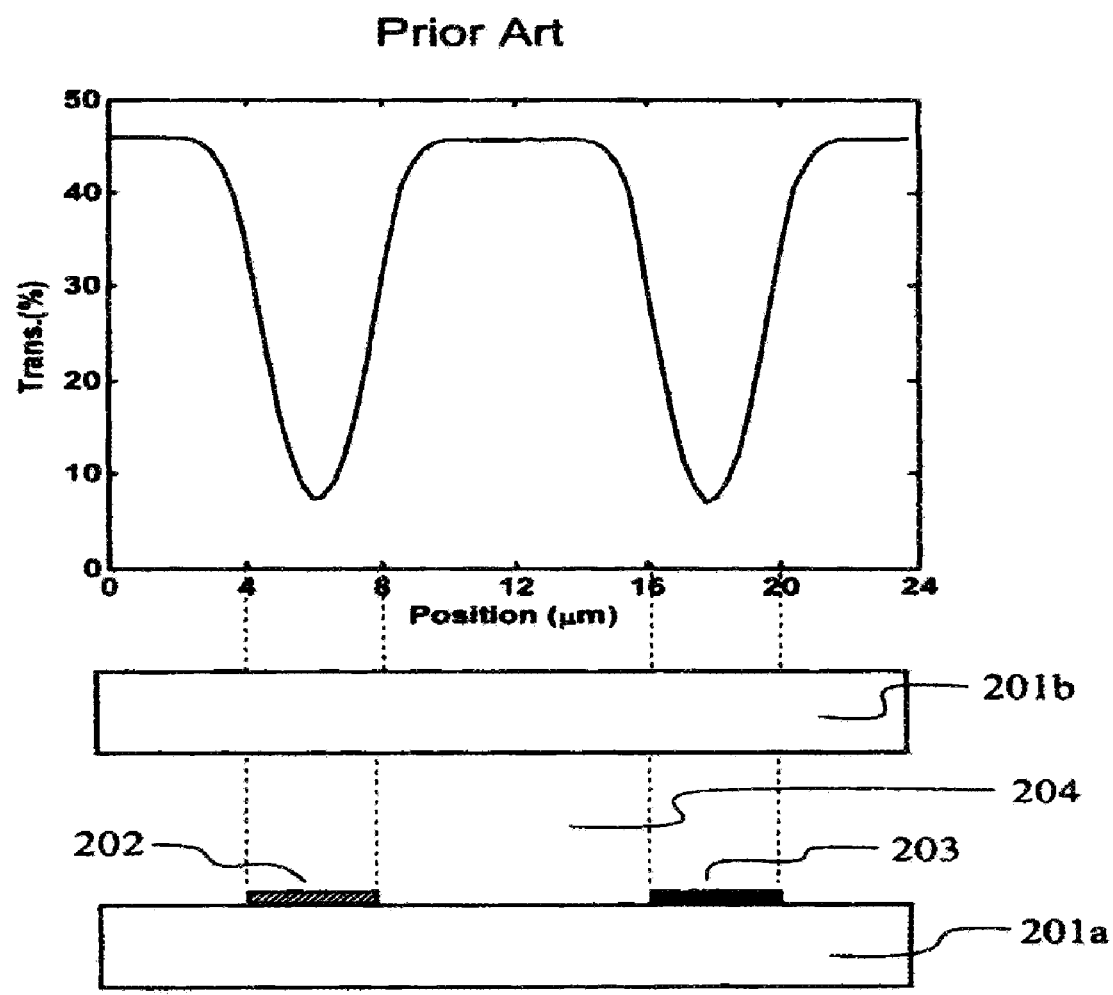
FIG. 1b is a schematic of another prior art in-plane switching LCD structure with transparent electrodes and a graph of the transmittance curve versus position under crossed-polarizers corresponding to the in-plane switching LCD.

The following is a list of the reference numbers used in the drawings and the detailed specification to identify components:

101a first substrate
101b second substrate
102 electrode
103 electrode
104 liquid crystal layer
201a first substrate
201b second substrate
202 common electrode
203 pixel electrode
204 liquid crystal layer
301 common electrode
302 common electrode
303 pixel electrode
304 pixel electrode
305 pixel electrode
306 common electrode
401 common electrode
402 common electrode
403 pixel electrode
404 pixel electrode
405 pixel electrode
406 common electrode
407 insulating layer
410a alignment layer
410b alignment layer
501 common electrode
502 common electrode
503 pixel electrode
504 pixel electrode
505 pixel electrode
506 common electrode
511 compensation film
512 compensation film
513 biaxial layer
520a first polarizer
520b second polarizer The apparatus, methods, systems and devices of the present invention disclose a common electrode and pixel electrode design for producing a high aperture ratio, high transmittance, and wide viewing angle LCD device. The liquid crystal display of the present invention increases the aperture ratio and transmittance, and maintains a high storage capacitance by including an auxiliary pixel electrode made of metal and which only occupies a small ratio of the transparent areas. FIG. 1b shows the structure of an IPS LCD having a first and second substrate 201a and 201b, respectively, with a liquid crystal layer 204 sandwiched therebetween and common electrode 202 and pixel electrode 203 are made of transparent ITO materials. The transmittance curve versus position for an IPS mode with transparent electrodes according to the present invention is plotted in FIG. 1b. The transmittance above the electrode regions is improved but is still limited. This is because the electric fields in the regions between the electrodes are parallel to the substrates, which make the liquid crystal directors mainly twist in these regions to reach a high transmittance. However, the electric fields in the regions above the electrode surfaces have strong components perpendicular to the electrode surfaces. The strong vertical field components make the liquid crystal directors mainly tilt up rather than twist, which results in low transmittance zones under the crossed-polarizer structure of this IPS mode. Therefore, although using of transparent electrodes increases the aperture ratio, the transmittance is still not improved to a level that could be comparable to the TN LCDs.

Figure 2A:
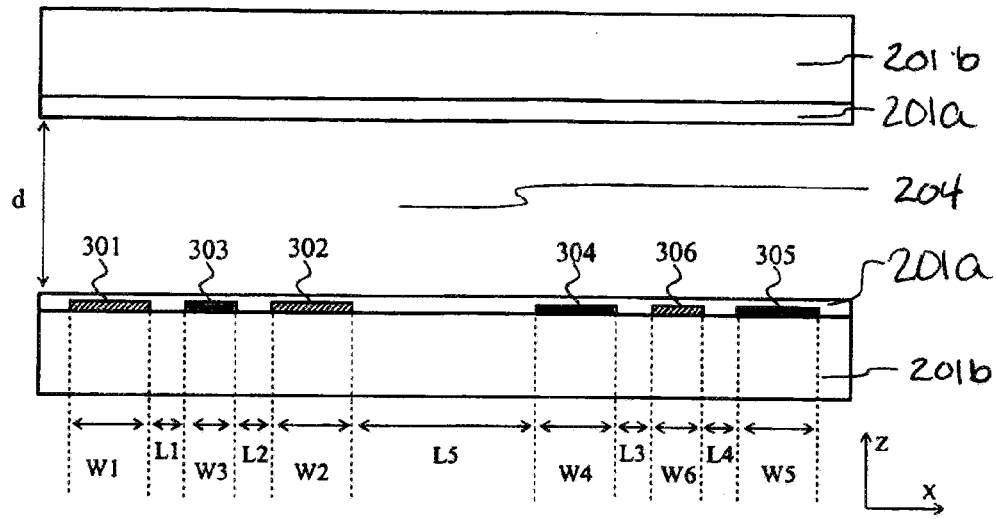
FIG. 2a is a schematic of a high transmittance and wide viewing angle LCD structure according to the present invention with common and pixel electrodes located in the same layer.

FIG. 2A shows the structure of a high transmittance and wide viewing angle LCD structure 300 with two electrode groups formed in the same layer. One group having common electrodes 301 and 302 and pixel electrode 303 functioning as a common electrode and the other group including common electrode 306 and pixel electrodes 304 and 305 functioning as a pixel electrode. An alignment layer 310a and 310b is formed on the interior surface of the first and second substrate 201a and 201b, respectively, and a liquid crystal layer 204 is sandwiched between the alignment layer 310a and 310b which are separated by a distance d, which is the thickness or cell gap of the liquid crystal cell.

The alignment layers 310a and 310b can be polyimide films and are interposed between the substrate 201a and the liquid crystal layer 204 and between the substrate 201b and the liquid crystal layer 204. A plurality of transparent common electrodes 301, 302, and 306 and a plurality of transparent pixel electrodes 303, 304, and 305 are formed on the substrate 201a in each pixel and a thin-film transistor (not shown) is formed on the substrate 201a in each pixel. Alternatively, the above-described structure further includes two linear polarizers (not shown) on the first and second substrates 201a and 201b wherein a polarizing axis of the first polarizer coincides with the rubbing direction of the liquid crystal layer or the direction perpendicular to the rubbing direction, and a polarizing axis of the second polarizer is perpendicular to the polarizing axis of the first polarizer.

According to FIG. 2A, common electrodes 301, 302, and pixel electrode 303 form a first group of electrodes with the pixel electrode 303 is located between the common electrodes 301 and 302. The second group of electrodes includes pixel electrodes 304 and 305 and common electrode 306 with common electrode 306 located between the pixel electrodes 304 and 305. The first and second groups of electrodes are formed on the same layer and are separated by a selected distance. The width of the each electrode and the distances in-between the electrodes are selected such that the liquid crystal directors in the regions overlying above each of the first and second electrode group are driven by substantial fringe electric fields and the liquid crystal directors in the regions overlying between the electrode groups are driven by substantially horizontal electric fields.

To achieve the required electric field profile, the distances between the center common or pixel electrode to the two adjacent pixel or common electrodes are less than the thickness of the liquid crystal layer. As shown in FIG. 2A, the distance L1 between the common electrode 301 and the pixel electrode 303 is lass than the thickness of the liquid crystal layer d. The distance L2 between the pixel electrode 303 and the common electrode 302, the distance L3 between pixel electrode 304 and common electrode 306, and the distance L4 between common electrode 306 and pixel electrode 305 are also less than the thickness d of the liquid crystal layer 204. As shown in FIG. 2a, the distance L5 between adjacent electrodes 302 and 304 from the two different electrode groups is greater than the cell gap d of the liquid crystal layer 204.

The liquid crystal layer 204 in this embodiment is a positive liquid crystal material with dielectric anisotropy $\Delta\in$ greater than 0 is used. For the cell with positive liquid crystal materials, the preferred product of the thickness d of the liquid crystal layer and the refractive index anisotropy Δn of the liquid crystal material is within a range of approximately 0.25 to approximately 0.75 micrometers. The widths W1, W2, W4, and W5 of the electrodes 301, 302, 304, and 305, are not necessarily equal, but are preferred to have a ratio of approximately 0.1 to approximately 0.95 with respect to the cell gap d of the liquid crystal layer 204. Similarly, the widths W3 and W6 of the center electrodes 303 and 306 are not necessarily to be equal but are preferred to have a ratio of approximately 0.1 to approximately 0.75 micrometers with respect to the cell gap d of the liquid crystal layer. The distances L1, L2, L3, and L4 between adjacent electrodes preferably have a ratio of approximately 0.1 to 0.95 micrometers with respect to the cell gap d of the liquid crystal layer. The distance L5 between the two adjacent electrodes from different groups preferably has a ratio of approximately 1.0 to approximately 3.0 micrometers with respect to the cell gap d.

For the homogeneously aligned (or anti-parallel rubbing) positive liquid crystal cell in this embodiment, the preferred rubbing angle of the positive liquid crystal materials on the inner surfaces is between approximately 45 degrees to approximately 90 degrees from the x-axis in the x-y plane and the pretilt angle on the inner surfaces of the substrates 201a and 201b is set in a range of approximately 0.5 degrees to approximately 10 degrees.

Figure 2B:
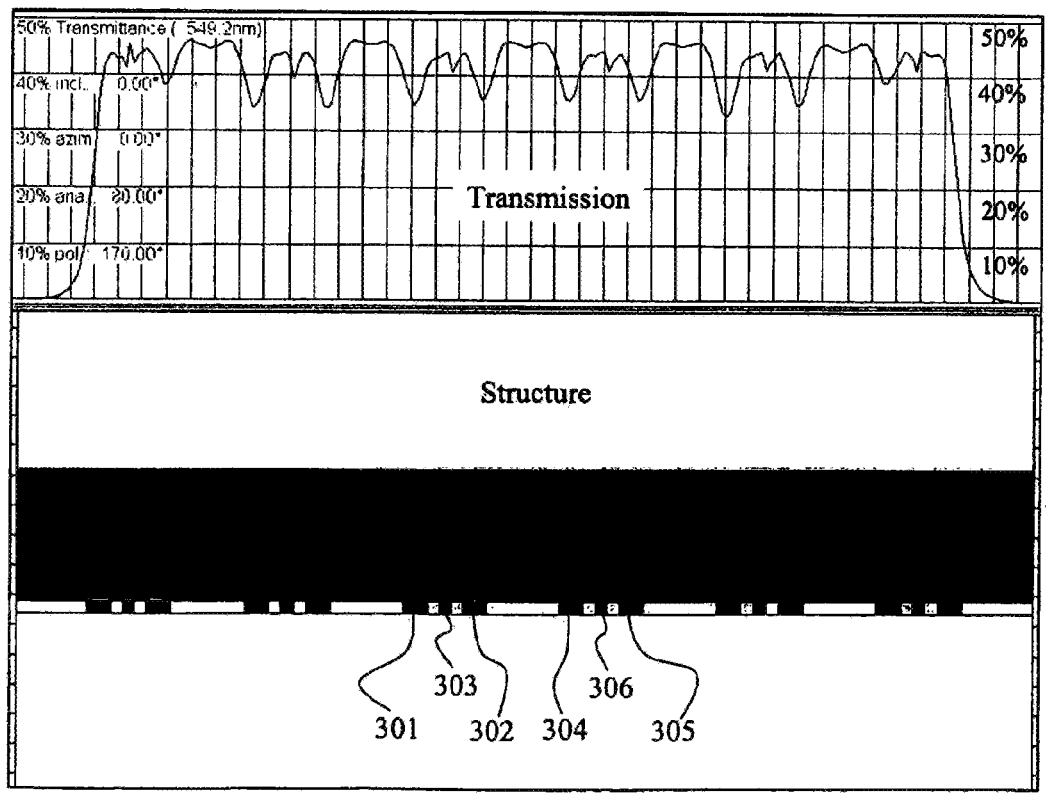
FIG. 2b is a graph of the simulated transmittance curve versus position under crossed-polarizers of the high transmittance and wide viewing angle LCD structure shown in FIG. 2a with a positive dielectric anisotropic, homogeneous liquid crystal cell.
Figure 2B:
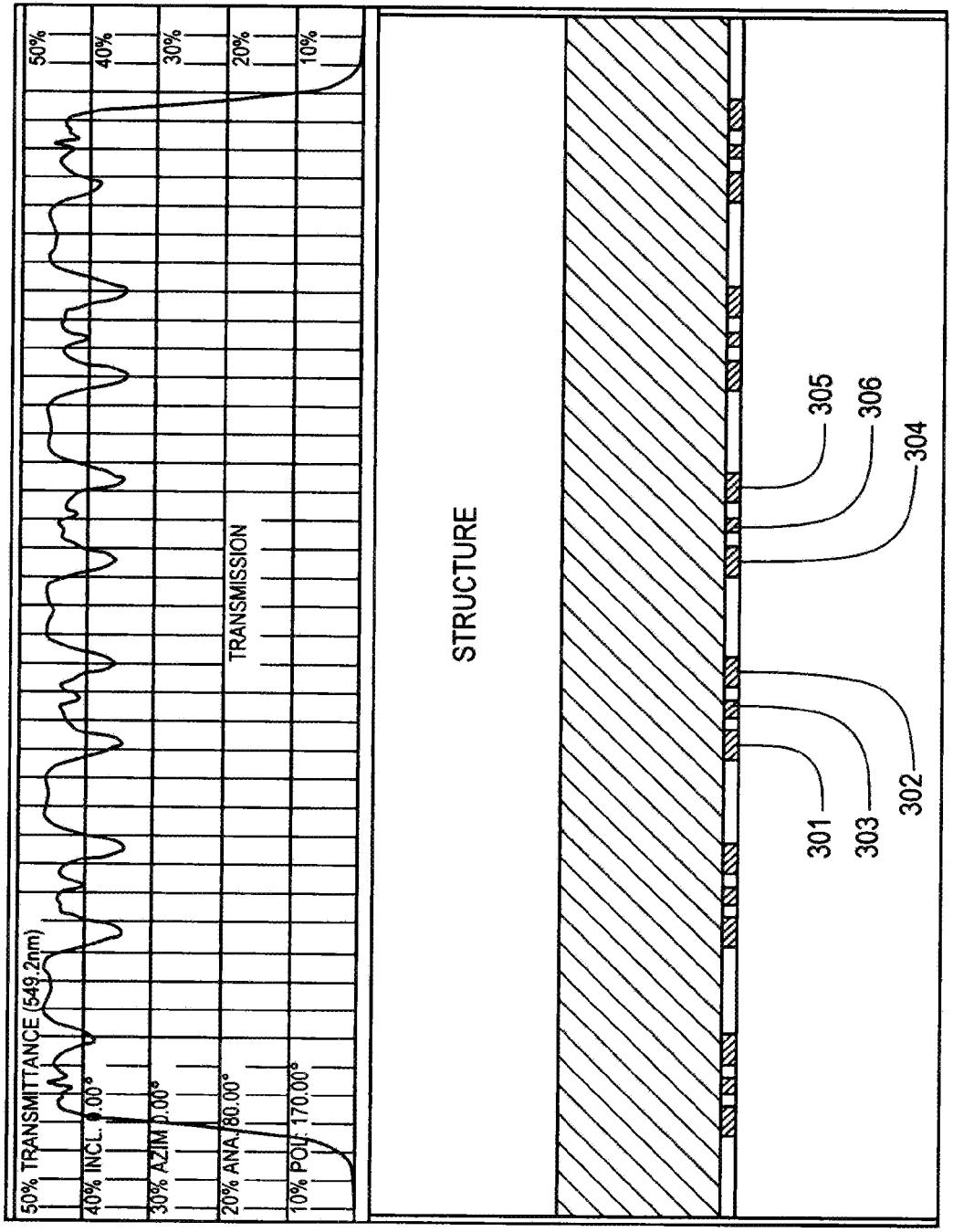

FIG. 2b shows a graph of the simulation results of the structure shown in FIG. 2a using a homogeneously aligned positive anisotropic liquid crystal material. The transmittance is greatly enhanced compared to the conventional IPS LCDs using transparent electrodes as in FIG. 1b. This is because the electrode groups function like a continuous common or pixel electrode since the widths of the electrodes and distances between the electrodes are less than the cell gap. Furthermore, the distance L5 between the adjacent two groups of electrodes is larger than the liquid crystal cell gap d. As a result, substantially horizontal electric fields fully twist the liquid crystal directors and the transmittance between the two groups of electrodes is high. The regions above the two electrode groups substantially fringe fields are produced and twist the liquid crystal directors with less tilt than the conventional IPS mode because the electrode distance between adjacent pixels is smaller than the cell gap d, which results in good transmittance. Therefore, both fringe field and the horizontal field components perform simultaneously to attain a high transmittance throughout the cell.

In this embodiment, the transmittance achieved is approximately 42.3% out of the possible maximum 46.0% value under the selected crossed-polarizers configuration shown in FIG. 2b. This mode has approximately 92.0% of the maximum transmittance, while a conventional IPS has a transmittance of only approximately 75.0%. Therefore, the mode produced by this embodiment of the present invention improves the light efficiency by approximately 22.6% when compared to the light efficiency of the prior art IPS mode.

In an alternative embodiment, a homogeneously aligned, or anti-parallel rubbing, negative Δε liquid crystal cell is used in structure shown in FIG. 2a. In this embodiment the same dimension ranges are used and the preferred rubbing angle is between approximately 0 degrees to approximately 45 degrees away from the x-axis in the x-y plane and a pretilt angle is selected to be in a range of approximately 0.5 degrees to approximately 10 degrees.

Figure 2C:
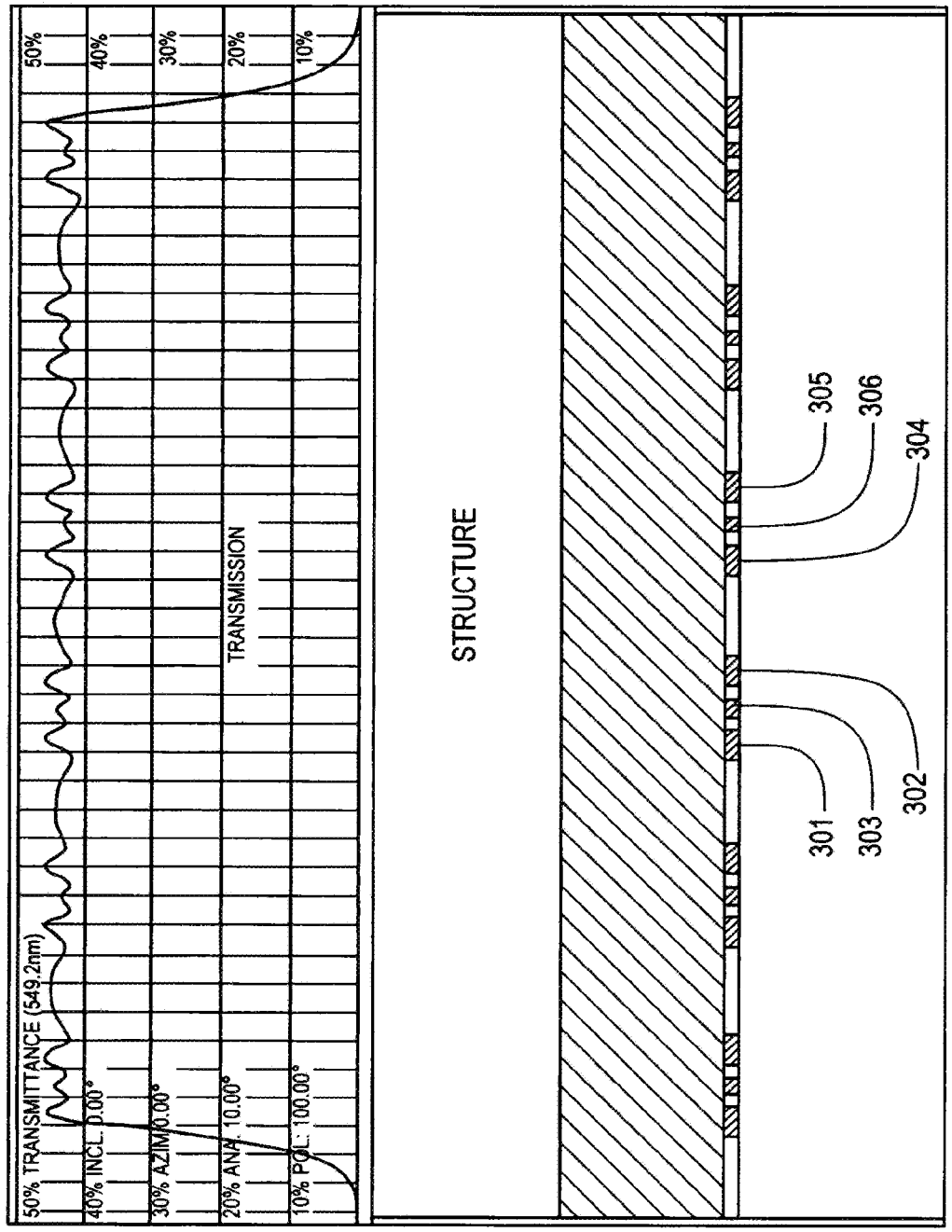
FIG. 2c is another graph of the simulated transmittance curve versus position under crossed-polarizers of the high transmittance and wide viewing angle LCD structure shown in FIG. 2a with a negative dielectric anisotropic, homogeneous liquid crystal cell.

FIG. 2c shows the simulation results of resulting from structure shown in FIG. 2a using a homogeneously aligned negative liquid crystal material 204b. The resulting transmittance is approximately 44.4% out of the possible maximum 46.0% value under the crossed-polarizers and has approimately 96.0% of the maximum transmittance. The higher transmittance from a negative liquid crystal material over the positive liquid crystal is evident because there is relatively little tilt effect above the electrode surface regions in a negative liquid crystal cell.

Figure 3A:
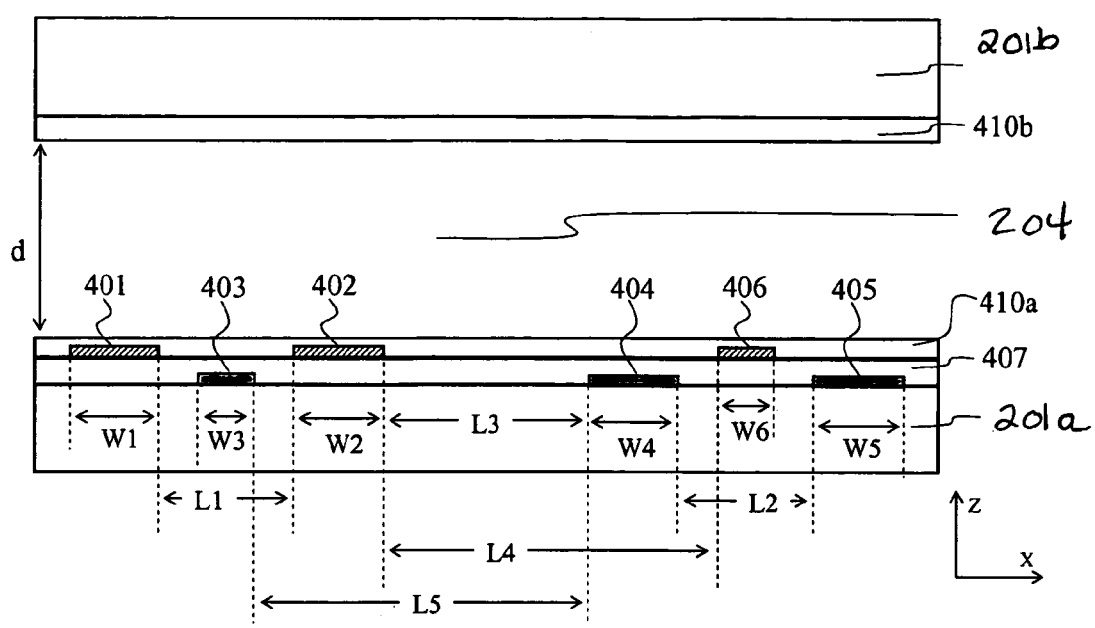
FIG. 3a is a schematic of a high transmittance and wide viewing angle LCD structure with common and pixel electrodes located in two different layers.

To simplify fabrication of the liquid crystal display, it is also preferable that the common and pixel electrodes are formed on different layers and are separated by an insulating layer, as shown in FIG. 3a. A liquid crystal layer 204 is sandwiched by inner surfaces of the first and second substrates 201a and 201b such as glass; two alignment layers 410a and 410b separated by a selected distance d, which is the thickness or cell gap of the liquid crystal cell. The alignment layers 410a and 410b can be polyimide films. The first and second alignment layers 410a and 410b are located between the first and second substrate 201a and 201b and the liquid crystal layer 204, respectively. A plurality of repetitive common electrodes 401, 402, and 406 and a plurality of repetitive pixel electrodes 403, 404, and 405 are formed on the first substrate 201a in each pixel area and the common electrode and the pixel electrodes are located in different layers, separated by an insulating layer 407. As shown in FIG. 3a, the pixel electrodes 403, 404, and 405 are formed on the first substrate 201a while the common electrodes 401, 402, and 406 are formed on the insulating layer 407. A thin-film transistor (not shown) is also formed on the first substrate 201a in each pixel area. The first and second substrates 201a and 201b are sandwiched between a first and a second linear polarizer (not illustrated here). The polarizing axis of the first polarizer coincides with the rubbing direction or the direction which is perpendicular to the rubbing direction, and a polarizing axis of the second polarizer is perpendicular to the polarizing axis of the first polarizer.

As shown in FIG. 3A, in each small repeating period in one pixel, common electrodes 401, 402 and pixel electrode 403 forms a first group of electrodes, where the pixel electrode 403 is between the common electrodes 401 and 402. The second group of electrodes includes pixel electrodes 404, 405 and common electrode 406 and the common electrode 406 is between the pixel electrodes 404 and 405. Like the previous embodiment shown in FIG. 2a, the liquid crystal directors in the regions overlying above each electrode group are driven by substantial fringe electric fields and the liquid crystal directors in the regions overlying between the electrode groups are driven by substantial horizontal electric fields to achieve high transmittance. The preferred rubbing angle range for the homogeneously aligned positive liquid crystal cell is approximately 45 degrees to approximately 90 degrees away from the x-axis in the x-y plane. And the pretilt angle is set in a range of around 0.5 degrees to 10 degrees.

In this embodiment, to obtain a substantial fringe electric field, the width of the pixel electrode 403 can be larger than the distance between the adjacent common electrodes 401 and 402 in the first group of electrodes. In the second group of electrodes, the distance L2 between the pixel electrodes 404 and 405 can be less than the width of the common electrode 406. In fact, pixel electrodes 404 and 405 can merge into one pixel electrode. However, the distance L3 between the first and second electrode groups is still required to be equal to or larger than the cell gap d of the liquid crystal layer. More specifically, it is preferred that the widths W1 and W2 of common electrodes 401 and 402 have a ratio between approximately 0.1 and approximately 0.95 in respect to the cell gap d of the liquid crystal layer and the width W3 of the pixel electrode 403 is preferred to have a ratio between approximately 0.1 and approximately 2.5 with respect to the liquid crystal layer cell gap d. In the second group of electrodes; the widths W4 and W5 of the pixel electrodes 404 and 405 are preferred to have a ratio between approximately 0.1 and approximately 2.75 with respect to the liquid crystal layer cell gap d and the width W6 of the common electrode 406 is preferred to have a ratio between approximately 0.1 and approximately 0.95 with regard to the cell gap d.

The distance L1 between the common electrodes 401 and 402 has a preferred ratio between approximately 0.1 and approximately 2.0 with respect the cell gap and the distance L2 between pixel electrodes 404 and 405 has a preferred ratio of between approximately 0 and approximately 2.65 with respect to the liquid crystal layer cell gap. The distance L3 between the two groups of electrodes, is preferred to have a ratio between approximately 1.0 and approximately 3.0 with regard to cell gap d to generate a horizontal electric fields. To further determine the relative positions between the two electrode groups, the distance L4 between common electrodes 402 and 406 is preferred to have a ratio of between approximately 1.1 and approximately 5.65 with respect to the cell gap and the distance L5 between pixel electrodes 403 and 404 is preferred to have a ratio of between approximately 1.1 and approximately 5.85 with respect to the cell gap.

Figure 3B:
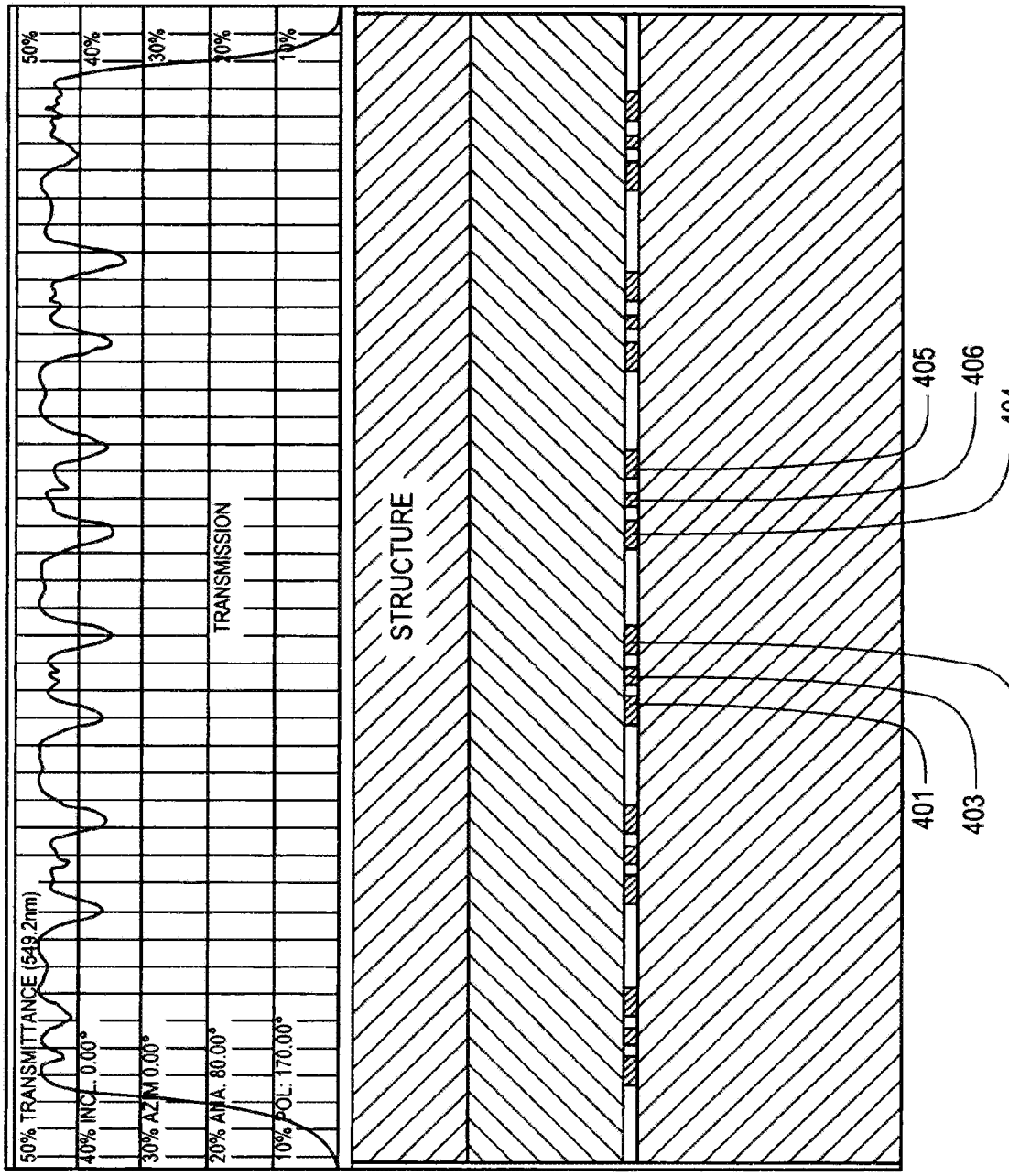
FIG. 3b is a graph of the simulated transmittance curve versus position under crossed-polarizers of the high transmittance and wide viewing angle LCD structure shown in FIG. 3a with a positive dielectric anisotropic, homogeneous liquid crystal cell.

The liquid crystal layer is a homogeneously aligned positive liquid crystal. The rubbing angle is approximately 45 degrees to approximately 90 degrees away from the x-axis in the x-y plane and the pretilt angle is in a range of approximately 0.5 degrees to approximately 10 degrees. FIG. 3b is a graph showing the simulation results of the structure shown in FIG. 3a when the liquid crystal layer is a positive liquid crystal material. As shown, the transmittance is also greatly enhanced in comparison to the conventional in-plane switching LCD using transparent electrodes. The achieved transmittance is approximately 42.0% out of the possible maximum 46.0% which is approximately 91.0% of the maximum transmittance.

Figure 3C:
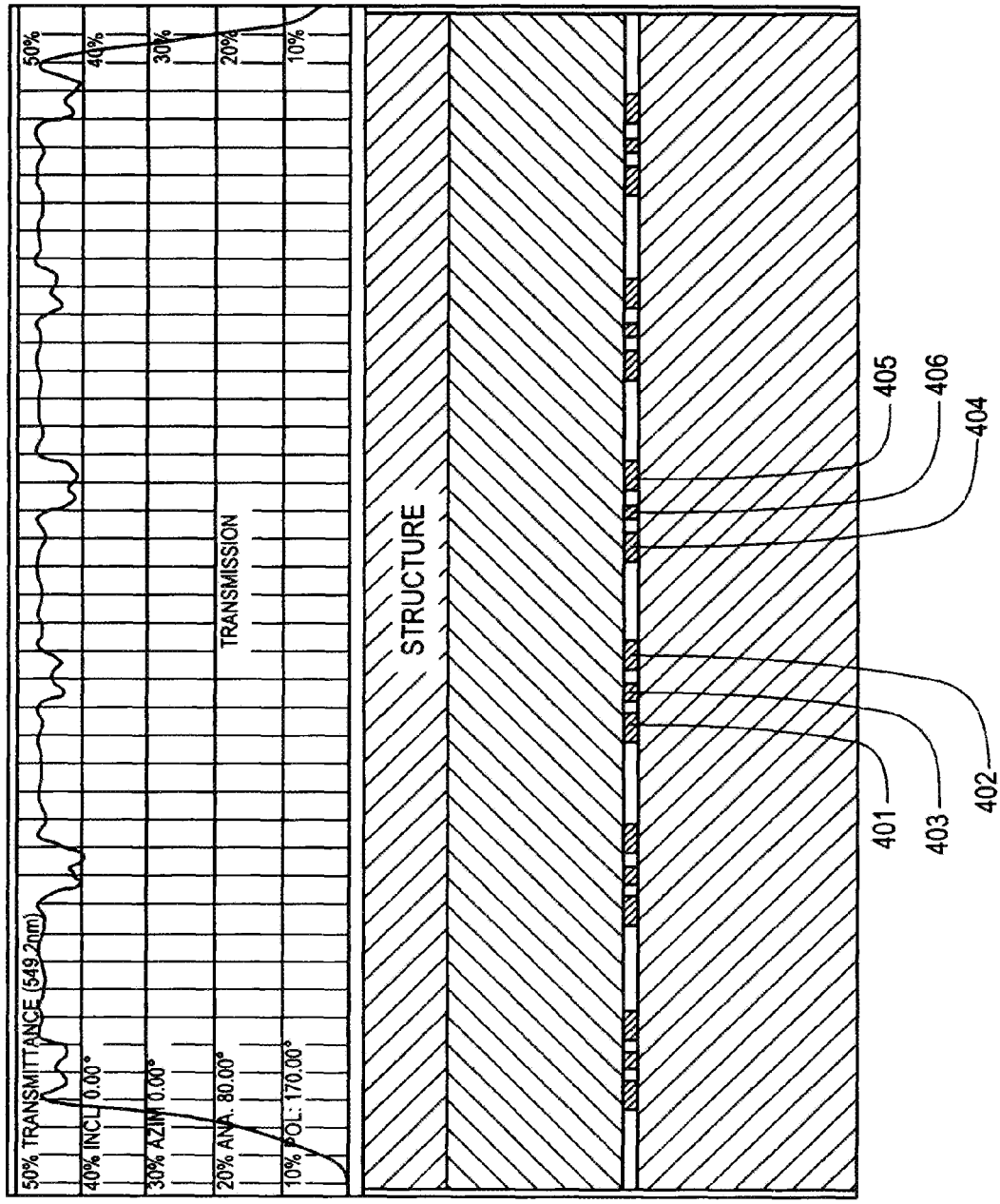
FIG. 3c is a graph of the simulated transmittance curve versus position under crossed-polarizers of the high transmittance and wide viewing angle LCD structure shown in FIG. 3a with a negative dielectric anisotropic, homogeneous liquid crystal cell.

Alternatively, homogeneously aligned negative liquid crystal material is used as the liquid crystal layer in the structure shown in FIG. 3a with same dimension ranges as described above with the positive liquid crystal material. The preferred rubbing angle is in this alternative embodiment is approximately 0 degrees to approximately 45 degrees from the x-axis in the x-y plane and the preferred pretilt angle is between approximately 0.5 degrees and approximately 10 degrees. FIG. 3c shows a graph of the transmittance curve corresponding to the structure illustrated in FIG. 3a with a negative liquid crystal material. The transmittance is approximately 44.5% under the selected crossed-polarizers which is approximately 96.6% of the maximum transmittance.

Figure 4A:
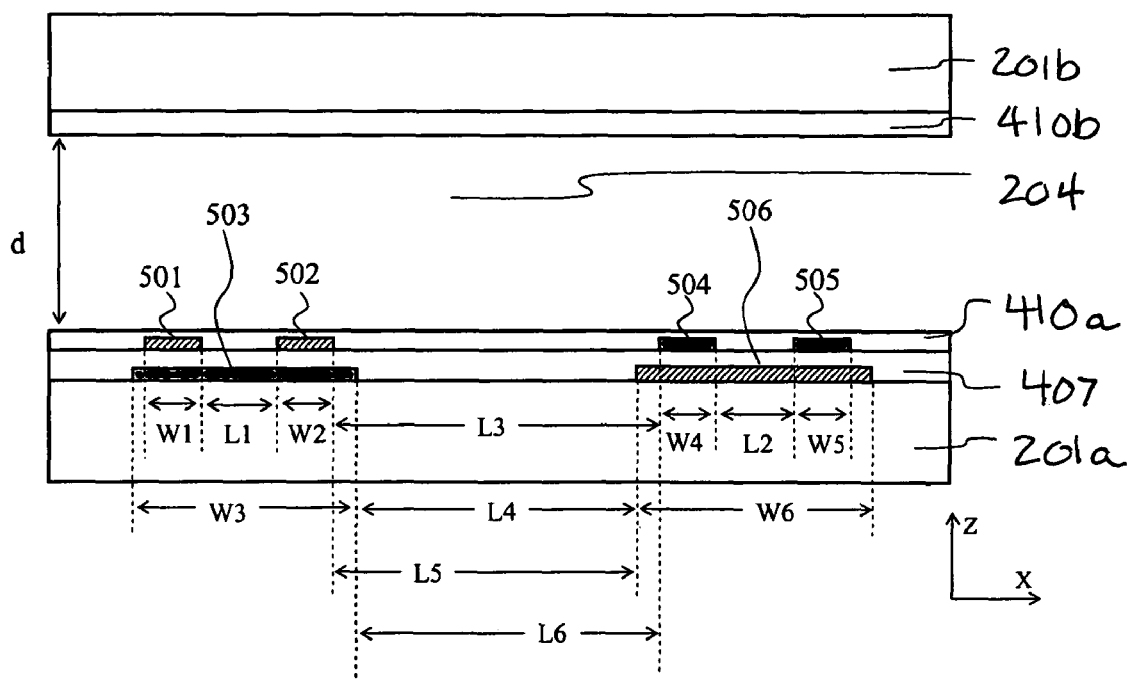
FIG. 4a is a schematic of a high transmittance and wide viewing angle LCD structure with both common electrodes and pixel electrodes located in different layers.

To further ease the fabrication of the liquid crystal device of the present invention, an alternative structure is shown in FIG. 4a. As in all the previous embodiments, alignment layers 410a and 410b are formed on the first and second substrate 201a and 201b and the liquid crystal layer 204 is sandwiched between the alignment layers 410a and 410b separated by a distance d, which is the cell gap. Two groups of transparent electrodes are formed on the substrate 201a in each pixel. The pixel electrode 503 and the common electrode 506 are located in the same layer; and the common electrodes 501 and 502 and the pixel electrodes 504 and 505 are located in another layer and the two layers are separated by the insulating layer 507, as shown in FIGS. 3a and 4a.

The difference between the structures shown in FIGS. 3a and 4a, is the width of the pixels and their placement. For example, in the first group of pixels shown in FIGS. 3a and 4a includes a pixel electrode 403 and 503, respectively, on the first substrate with completely different width W3.

To achieve above-described field distribution, a homogeneously aligned positive liquid crystal material is used. For a cell with positive liquid crystal materials, the preferred product of the cell gap d and the refractive anisotropy of the liquid crystal is between approximately 0.25 and approximately 0.75 micrometers. The widths W1, W2, W4, and W5 of the electrodes 501, 502, 504, and 505 formed on the insulating layer 407 are preferred to have a ratio between approximately 0.1 and approximately 0.95 with respect to the cell gap d, however, the widths W1, W2, W4, and W are not required to be equal. The widths W3 and W6 of the electrodes 503 and 506 on the first substrate 201a are preferred to have a ratio between approximately 0.1 and approximately 4.4 with respect to the cell gap d, however the widths W3 and W6 are not required to be equal.

The distances L1 and L2 between common electrodes 501 and 502 and pixel electrodes 504 and 505, respectively, have a preferred ratio of approximately 0.1 to approximately 2.0 with respect to the cell gap d. The distance L3 between the two adjacent common electrode 502 and pixel electrode 504 on the insulating layer is preferred to have a ratio of approximately 1.0 to approximately 3.0 with respect to the cell gap d. The distance L4 between the two adjacent electrodes 503 and 506 in the other layer is preferred to have a ratio of 1.0 to 8.7 with respect to the cell gap d. Furthermore, as shown in FIG. 4a, to determine the relative position between the electrodes in two different layers, the distances L5 and L6 between the common electrode 502 on the insulating layer and the common electrode 506 on the first substrate 201a and between the pixel electrode 503 on the first substrate 201a and the pixel electrode 504 on the insulating layer 407 have a preferred ratio of approximately 1.0 to approximately 5.85 and approximately 1.0 and approximately 5.85 with respect to the cell gap d, respectively.

Figure 4B:
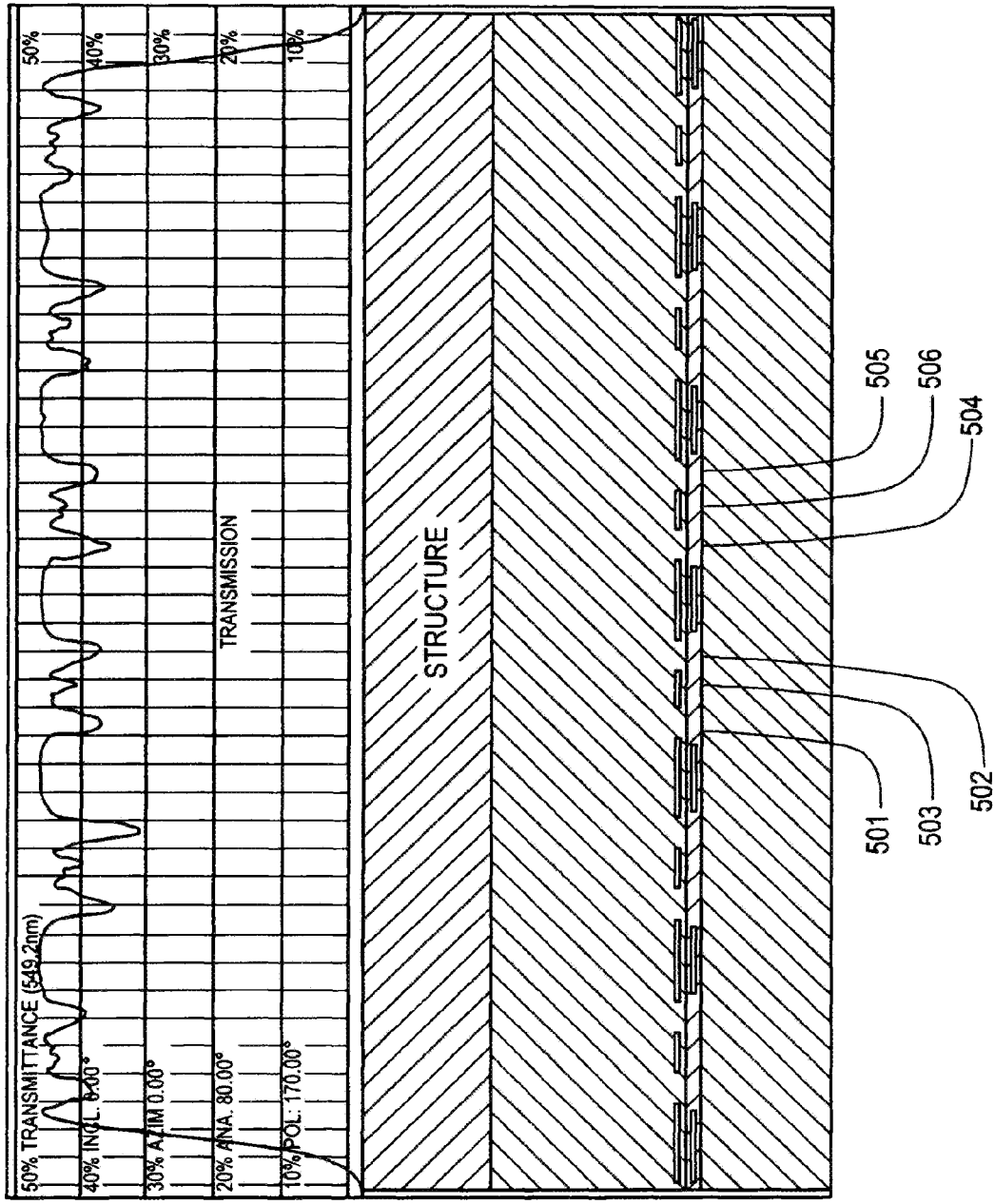
FIG. 4b is a graph of the simulated transmittance curve versus position under crossed-polarizers of the high transmittance and wide viewing angle LCD structure shown in FIG. 4a with a positive dielectric anisotropic, homogeneous liquid crystal cell.

FIG. 4b shows a graph of the simulation results for the structure shown in FIG. 4A with positive liquid crystal material, where the L3 value is larger than the L4 value. As shown by the graph, the transmittance is enhanced compared to the transmittance of a conventional IPS LCDs using transparent electrodes and the transmittance is as high as 92.0% of the transmittance of a conventional TN cell.

Figure 4C:
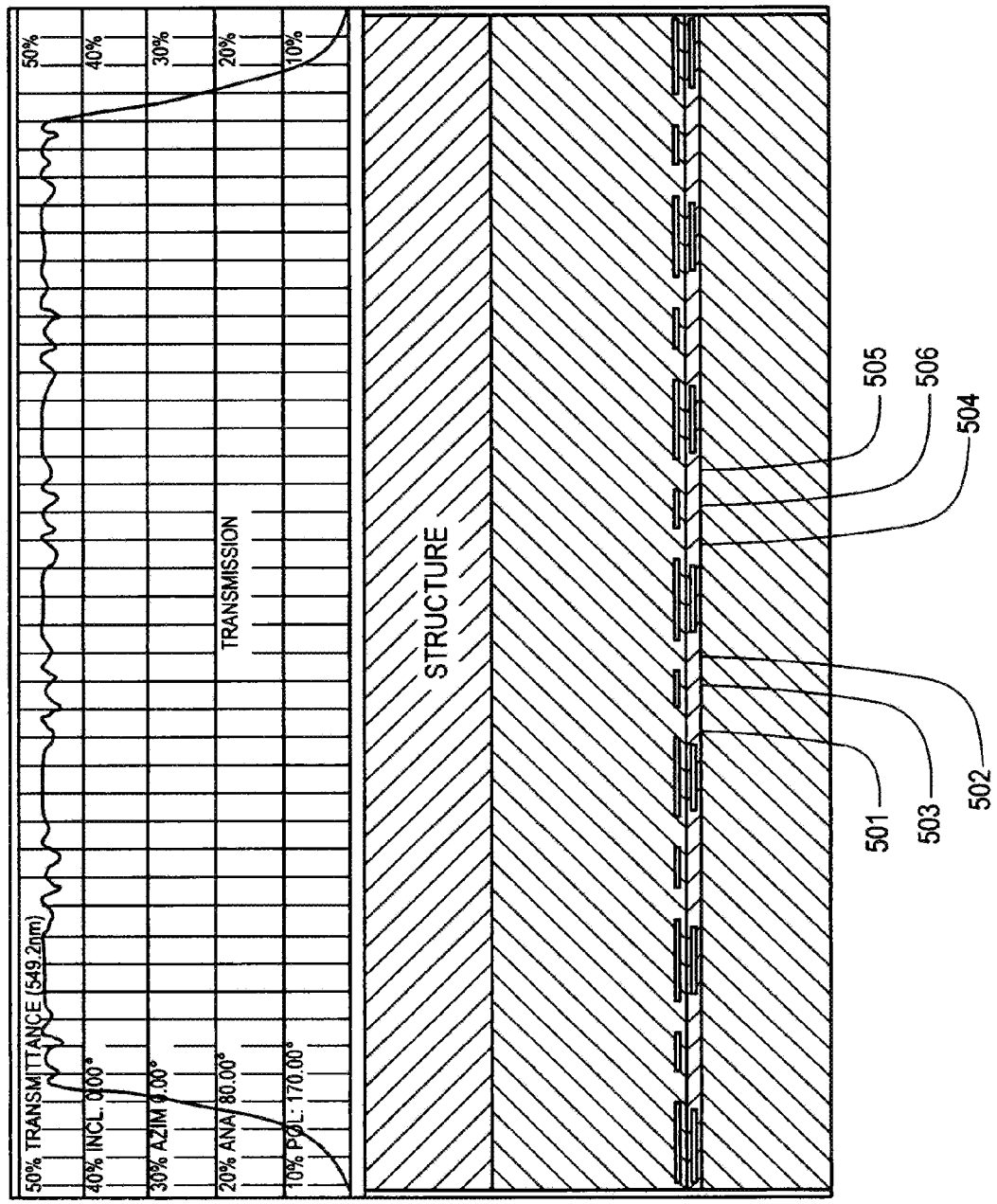
FIG. 4c is the simulated transmittance curve versus position under crossed-polarizers of the high transmittance and wide viewing angle LCD structure shown in FIG. 4a with a negative dielectric anisotropic, homogeneous liquid crystal cell.

Alternatively, a homogeneously aligned, or anti-parallel rubbing, negative liquid crystal material is used in the structure shown in FIG. 4c which is the plot for the simulated transmittance versus position. The device has the same dimension ranges for the product of the cell gap d and the refractive index anisotropy of the liquid crystal, the same widths of each common and pixel electrodes and the same distances in between the two groups of electrodes. A difference between the structures shown in FIGS. 4a and 4c is that the distance L3 in FIG. 4c is less than the distance L4. However, the preferred rubbing angle is approximately 0 degrees to approximately 45 degrees away from the x-axis in the x-y plane and the pretilt angle is set in a range of approximately 0.5 degrees to approximately 10 degrees. Using this alternative configuration, the transmittance reaches as high as 98.0% of a conventional TN cell.

In the previously described LCD devices, the liquid crystal layers are homogeneously aligned (or anti-parallel rubbing). However, to reduce the color shift of these devices, the PI cell, or parallel rubbed liquid crystal display devices as described in co-pending U.S. patent application Ser. No. 10/639,985, filed on Aug. 13, 2003, assigned to the same assignee as the present invention, can be substituted.

In this embodiment, a PI cell with positive liquid crystal is applied to the structure in shown FIG. 4a with same dimension ranges for the product of the cell gap d and the refractive index anisotropy of the liquid crystal, the same widths of each common and pixel electrodes, the same distances therebetween, and the same rubbing angle and pretilt angle.

Figure 5A:
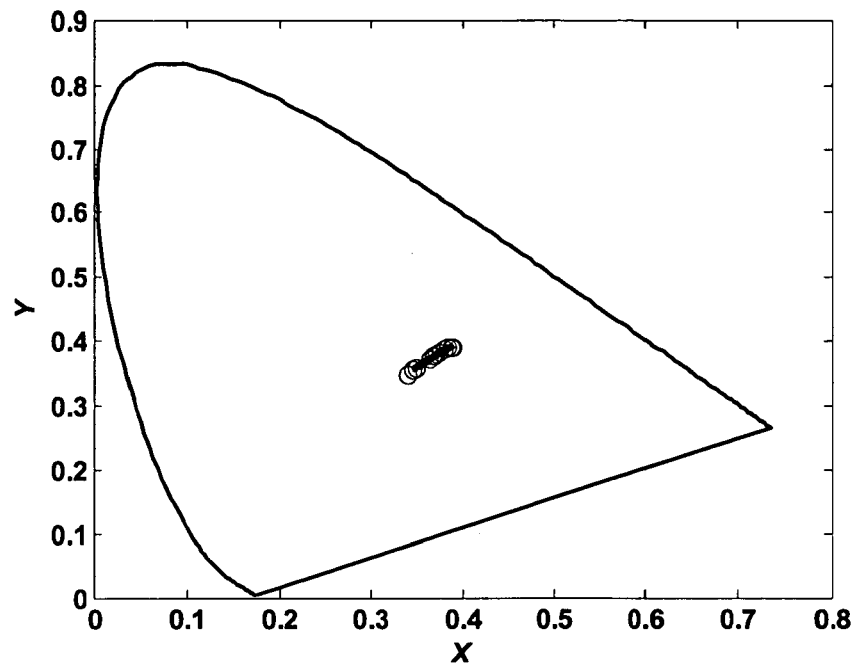
FIG. 5a is a graphical representation of the simulated color shift corresponding to the structure shown in FIG. 4a with positive dielectric anisotropic liquid crystals for the PI cell shown in the solid line and the homogeneous liquid crystal cell represented by circles.

FIG. 5a shows the simulated color shift performances of a homogeneous liquid crystal cell and a PI cell applied in the structure shown in FIG. 4a when a positive liquid crystal materials is used. The dots in FIG. 5a represent the color shift of the homogeneous cell, and the solid line in FIG. 5a represents the color shift of the PI cell. Because the PI cell inherently has a more symmetrical liquid crystal director distribution, as shown in FIG. 5a the color shift of the PI cell is smaller than that of the homogeneous cell.

Figure 5B:
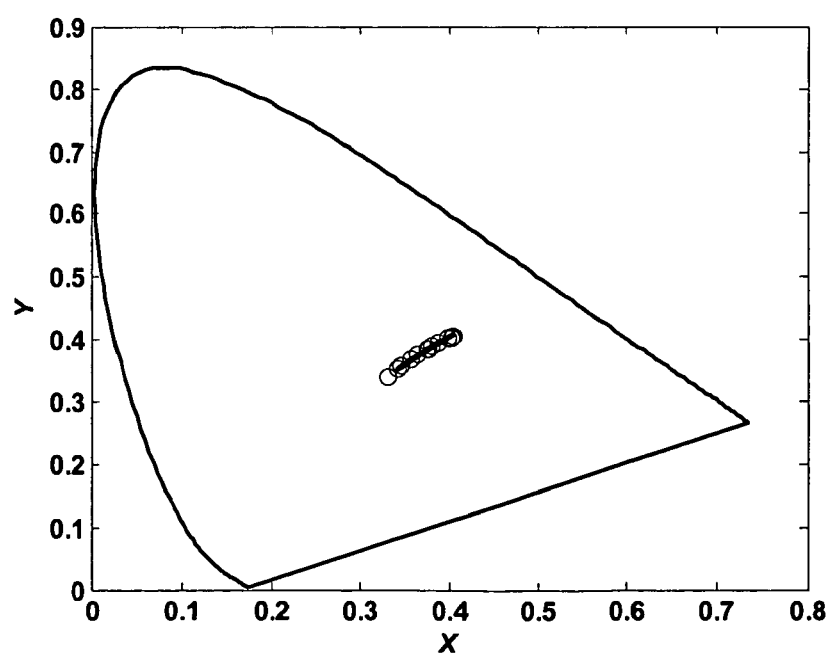
FIG. 5b is a graphical representation of the simulated color shift of the structure as FIG. 4a with negative dielectric anisotropic liquid crystals for the PI cell is shown by the solid line and the homogeneous liquid crystal cell circles.

Alternatively, a PI cell with negative liquid crystal is used in the structure shown in FIG. 4a with a preferred rubbing angle between approximately 0 degrees and approximately 45 degrees away from the x-axis in the x-y plane and the top and layer surfaces of the liquid crystal layer are parallel-rubbed with a preferred pretilt angle of approximately 0.5 to approximately 10 degrees. FIG. 5b shows the simulated color shift performances of a homogeneous liquid crystal cell and a PI cell used in the structure as FIG. 4a, with negative liquid crystal materials. The dots represent the color shift of the homogeneous cell, and the solid line represents the color shift of the PI cell. The PI cell shows less color shift than the homogeneous cell.

As shown in FIGS. 5a and 5b, introduction of a PI cell with either positive or negative materials into the structure in FIG. 4a reduces the color shift. The use of PI cell is not limited to use with the structure shown in FIG. 4a, the PI cell can be substituted in the structures in which initial liquid crystal directors are aligned parallel to the substrates and the horizontal fields mainly drive the liquid crystal directors when voltages are applied.

By introducing additional compensation films, such as uniaxial films to above-described structures, the viewing angle is greatly expanded. The above-described LCD structures have approximately the same initial liquid crystal director distributions, where in their voltage-off states the liquid crystal directors are parallel to the substrates. Hence similar film compensation schemes can be applied. For illustration, two uniaxial films as described in J. Chen, Optimum Film Compensation Modes for TN and VA LCDs, SID (1998), p. 315, are here used to compensate the dark state of the structure as FIG. 4a when positive liquid crystal material is used.

Figure 6A:
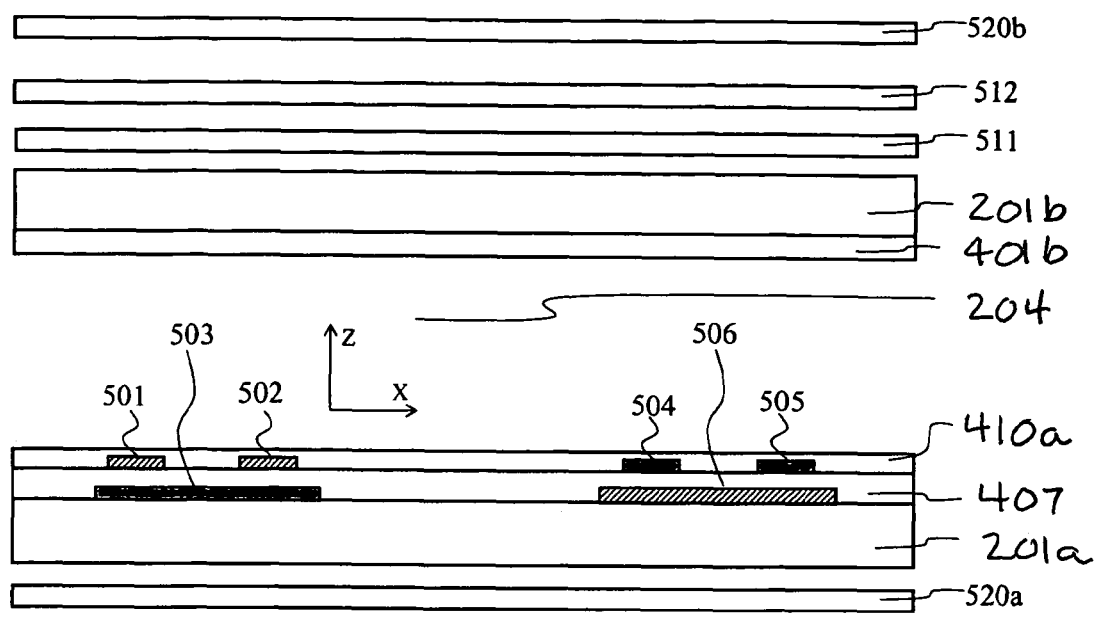
FIG. 6a is a schematic of a high transmittance and wide viewing angle LCD structure according to the present invention wherein uniaxial films are used as compensation film.

As shown in FIG. 6a, layers 520a and 520b are the first polarizer (previously described and not shown) and the second polarizer, respectively, wherein the absorption axis of the first polarizer 520a is coincided with the rubbing direction of liquid crystal layer 204, and the absorption axis of the second polarizer 520b is perpendicular to the absorption axis of the first polarizer 520a. Compensation films 511 and 512 are formed between the second polarizer 520b and the second substrate 500b. In this embodiment, compensation film 511 is a positive c-plate wherein the product of the thickness of the film and its refractive index anisotropy is set in a range of approximately 0.085 to approximately 0.095 micrometers. Compensation film 512 is a positive a-plate with a product of its thickness and its refractive index anisotropy set in a range of approximately 0.13 to approximately 0.15 micrometers; having an optical axis that coincides with the rubbing direction of the liquid crystal layer.

Figure 6B:
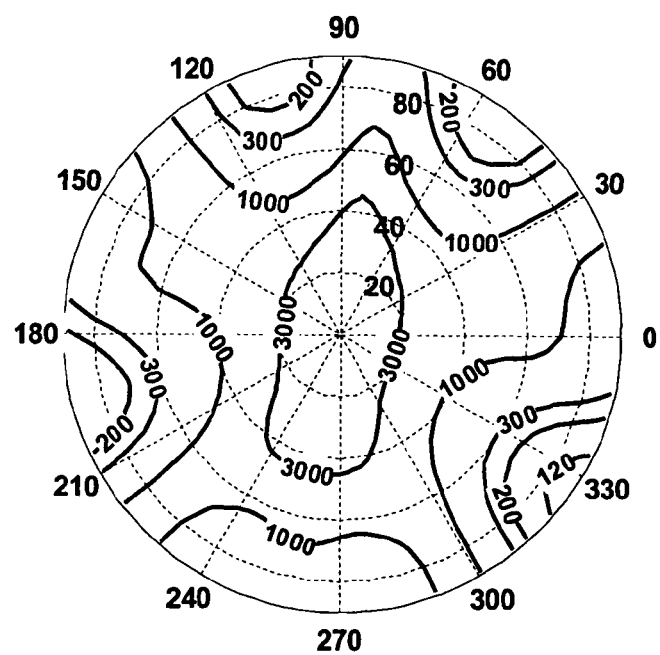
FIG. 6b shows a simulated iso-contrast plot for the structure shown in FIG. 6a with a positive dielectric anisotropic liquid crystal cell compensated by two uniaxial films.

FIG. 6b shows the simulated iso-contrast plot for the film compensated liquid crystal display shown in FIG. 6a with positive material. As shown, the contrast ratio is greatly enhanced to approximately greater than 120:1 at a viewing cone greater than approximately 80 degrees at all azimuthal angles.

Alternatively, the compensation layers 511 and 512 are located between the bottom substrate 201a and the first polarizer 520a, wherein the absorption axis of the second polarizer 520b and the optical axis of the positive a plate 512 are set coincided with the rubbing direction of liquid crystal layer 204.

Alternatively, the liquid crystal layer in the structure shown in FIG. 6a is a negative liquid crystal material. When negative material is used, the first compensation film 511 is a positive c-plate with s product of its thickness and its refractive index anisotropy is in a range of approximately 0.085 to approximately 0.095 micrometers. The second compensation film 512 is a positive a-plate with a product of its thickness and its refractive index anisotropy in a range of approximately 0.13 to approximately 0.15 micrometers; and the optical axis coincides with the rubbing direction of the negative liquid crystal layer.

Figure 6C:
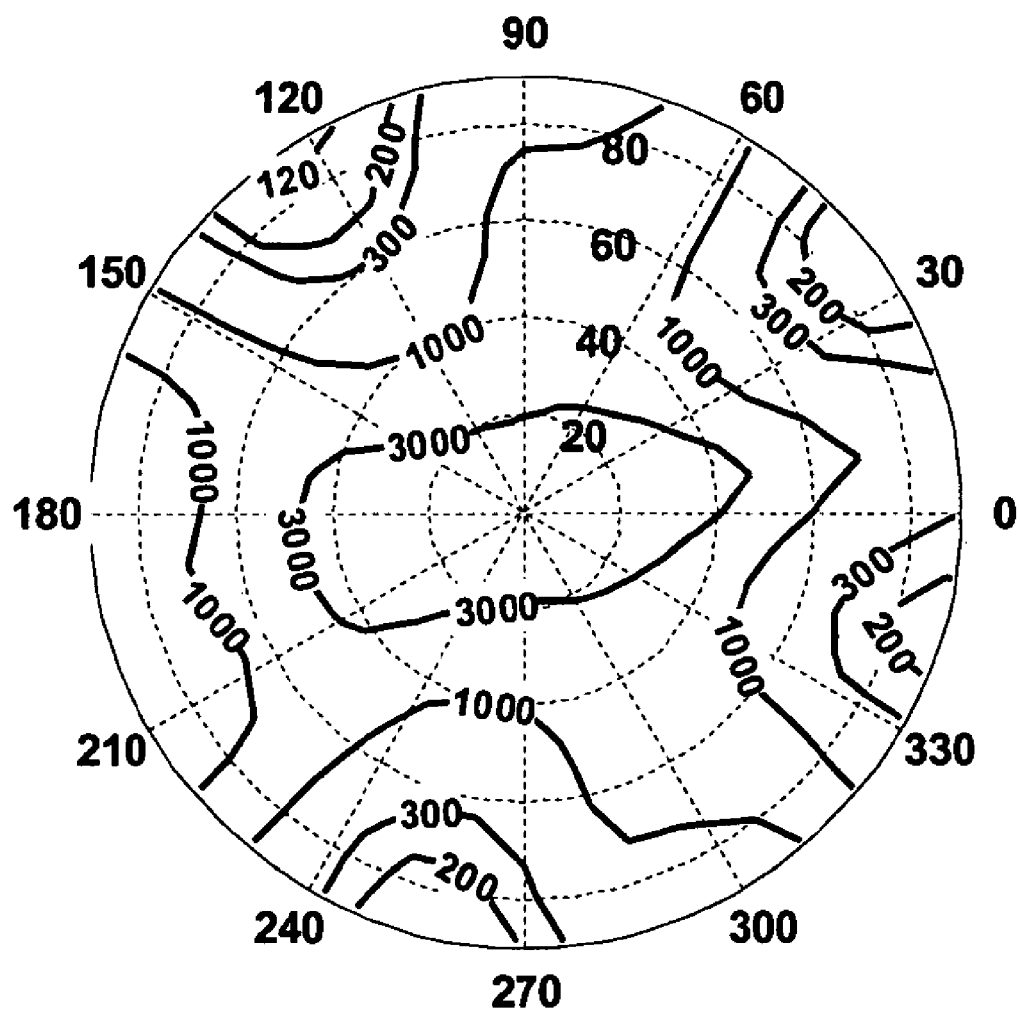
FIG. 6c shows a simulated iso-contrast plot for the structure shown in FIG. 6a with a negative dielectric anisotropic liquid crystal cell compensated by two uniaxial films.

FIG. 6c shows the simulated iso-contrast plot for the film compensated liquid crystal display shown in FIG. 6a with negative material used. The contrast ratio is greatly enhanced to approximately greater than 120:1 at a viewing cone greater than approximately 85 degrees at all azimuthal angles.

As previously described in regard to positive liquid crystal material, when the liquid crystal layer is negative, the compensation films 511 and 512 are located between the bottom substrate 201a and the first polarizer 520a, wherein the absorption axis of the second polarizer 520b and the optical axis of the positive a plate 512 are set coincided with the rubbing direction of liquid crystal layer 204.

The introduction of uniaxial compensation films into the structure in FIG. 4a with both positive and negative materials enhances the viewing angle. However, the uniaxial compensation films can also be used with the structures shown in FIGS. 2a and 3a with both positive and negative liquid crystal materials, in which initial liquid crystal directors are aligned parallel to the substrates in their voltage-off states.

Figure 7A:
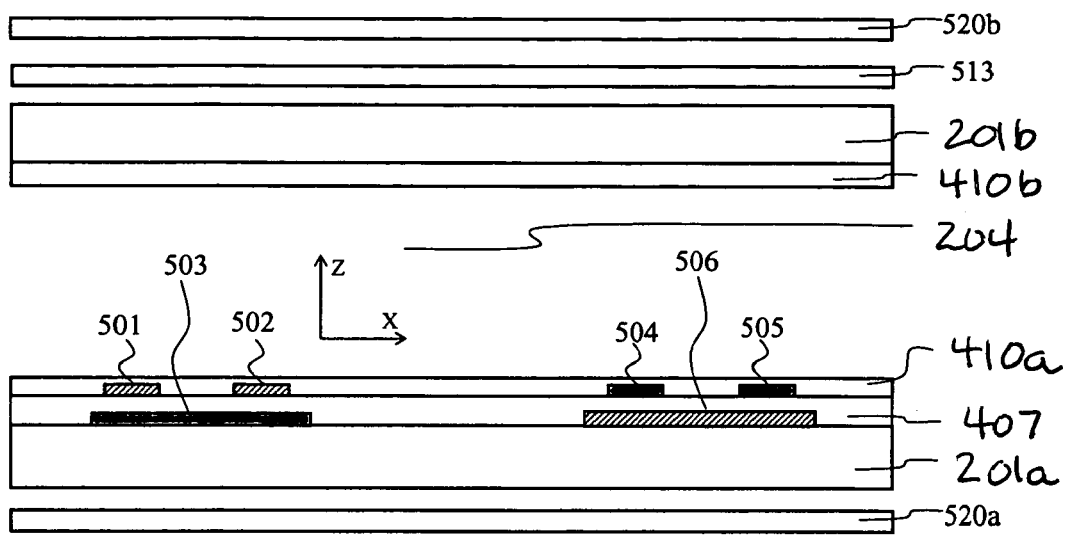
FIG. 7a is a schematic of high transmittance and wide viewing angle LCD structure in this invention where biaxial film is used as the compensation film.

Alternatively, the uniaxial compensation film 511 and 512 shown in FIG. 6a is replaced with a single biaxial compensation film 513 between the second substrate 201b and the second polarizer 520b as shown in FIG. 7a. The biaxial film, wherein nx, ny and nz are not equal, is used to compensate the dark state when a positive liquid crystal material is used as described in Y. Saitoh et al, Optimum Film Compensation of Viewing Angle of Contrast in In-Plane Switching-Mode Liquid Crystal Dissplay, Jpn. J. Appl. Phys, Vol. 37 (1998), pp. 4822-4828. The preferred rubbing angle of the positive liquid crystal material is in a range of approximately 45 degrees to approximately 90 degrees.

Figure 7B:
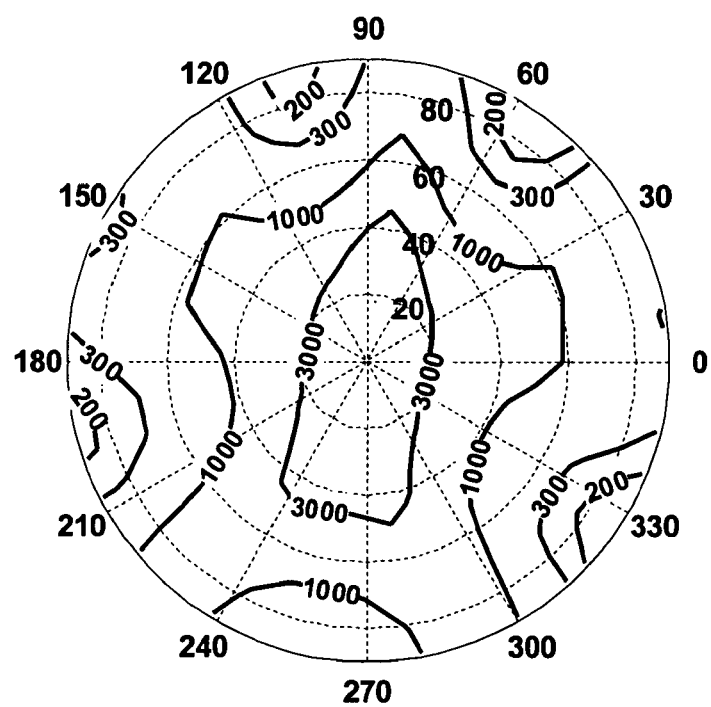
FIG. 7b shows a simulated iso-contrast plot for the structure shown in FIG. 7a with positive dielectric anisotropic liquid crystal cells compensated by a biaxial film.

To reduce the light leakage at large viewing angles in the voltage-off state while not interfering with the normal incidence, the nz axis is set perpendicular to the x-y plane and one of the other nx or ny axis is coincides with the rubbing direction of the liquid crystal layer. The preferred product of the film thickness and the difference between nx and ny is in a range of approximately 0.26 micrometers to approximately 0.28 micrometers. The preferred (nx−nz)/(nx−ny) is approximately 0.45 to approximately 0.55. FIG. 7b shows the simulated contrast ratio of the above compensated structure with positive materials. The greater than 200:1 contrast ratio is enhanced to within approximately an 80-degree viewing cone.

Alternatively, the biaxial compensation layer 513 is located between the first substrate 201a and the first polarizer 520a, wherein the nz axis is set perpendicular to the x-y plane and one of the nx or ny axis coincides with the rubbing direction of the liquid crystal layer.

Although the biaxial compensation layer has been described for use with a structure having positive liquid crystal material, negative material may be substituted to compensate the dark state of the structure as FIG. 7a with negative liquid crystal material having a preferred rubbing angle in a range of approximately 0 degrees to approximately 45 degrees. The nz axis of the biaxial film 513 is set perpendicular to the x-y plane and one of the nx or ny axis coincides with the rubbing direction of the negative liquid crystal layer. The preferred product of the film thickness and the difference between nx and ny is in a range of approximately 0.26 micrometers to approximately 0.28 micrometers and the preferred (nx−nz)/(nx−ny) is approximately 0.45 to approximately 0.55.

Figure 7C:
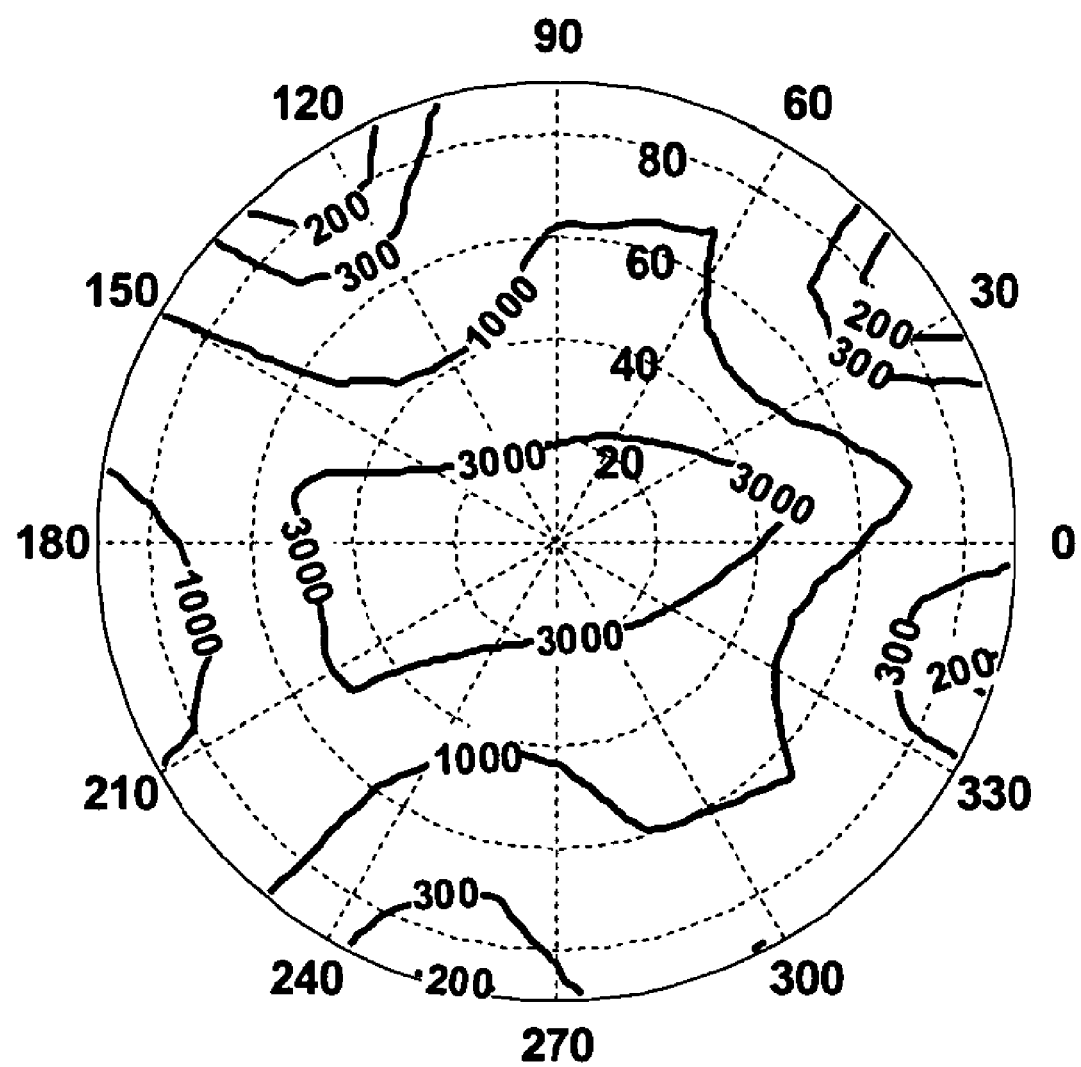
FIG. 7c shows a simulated iso-contrast plot for the structure shown in FIG. 7a with negative dielectric anisotropic liquid crystal cells compensated by a biaxial film.

FIG. 7c shows the simulated contrast ratio of the above compensated structure with negative material. The greater than 200:1 contrast ratio is enhanced to within an 80-degree viewing cone for this negative liquid crystal cell. As previously described in regard to the structure having positive liquid crystal material, the biaxial compensation layer 513 is alternatively located between the bottom substrate 201a and the first polarizer 520a, wherein its nz axis is set perpendicular to the x-y plane and its nx (or ny) axis is set in coincided with the rubbing direction of the liquid crystal layer.

As previously described in regard to the use of two uniaxial compensation filems 511 and 512, the substitution with biaxial film 513 also applied to the structures shown in FIGS. 2a and 3a to enhance the viewing angle with both positive and negative liquid crystals in which initial liquid crystal directors are aligned parallel to the substrates in their voltage-off states.

Figure 8A:
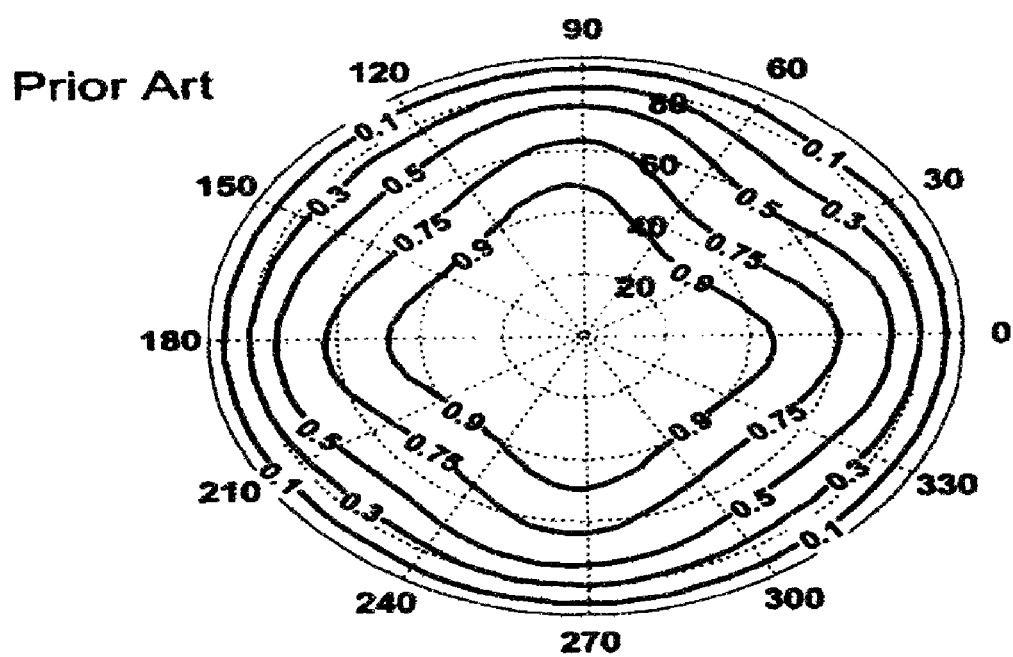
FIG. 8a shows a simulated iso-brightness plot of a TN cell of the prior art.
Figure 8B:
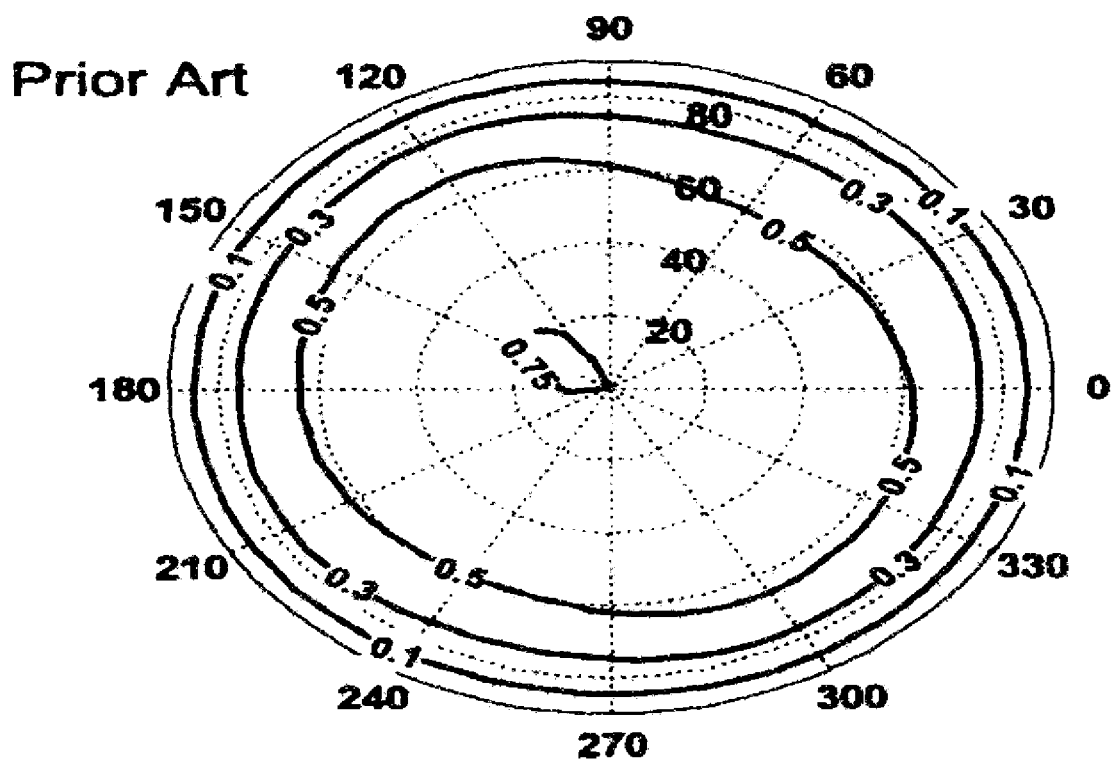
FIG. 8b shows a simulated iso-brightness plot of the prior art IPS mode with transparent electrodes as shown in FIG. 1b.

To show the unique brightness performance of the present invention, a series of simulated iso-brightness curves were plotted. The simulated iso-brightness curves are shown in FIGS. 8a to 8d for the conventional TN cell, the conventional IPS cell of FIG. 1b, the LCD cell shown in FIG. 4a with positive liquid crystal material and with negative liquid crystal material, respectively. The TN cell simulated iso-brightness curves shown in FIG. 8a has the highest brightness of approximately 100% at the center with a greater than 90% transmittance curve is within a cone of approximately 35 degrees at all azimuthal angles from approximately 0 degrees to approximately 360 degrees. The TN cell also has a greater than 75% transmittance curve within a cone of approximately 45 degrees at all azimuthal angles. The conventional IPS mode cell with transparent electrodes iso-brightness plot shown in FIG. 8b has the worst brightness performance. As shown in FIG. 8b, the maximum transmittance for the IPS cell at the center is approximately 75% of the TN cell and is very narrow.

Figure 8C:
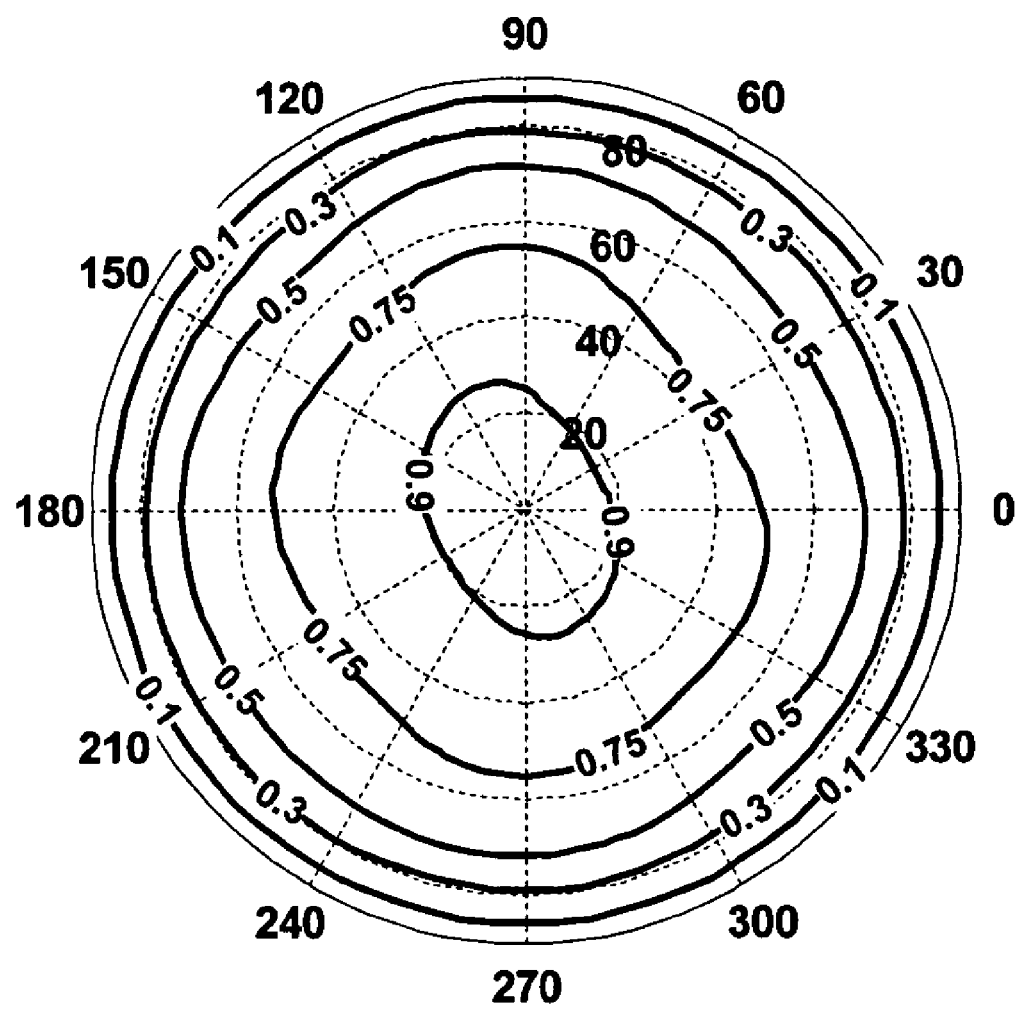
FIG. 8c shows a simulated iso-brightness plot of the high transmittance and wide viewing angle LCD structure shown in FIG. 4a with a positive dielectric anisotropic liquid crystal material.
Figure 8D:
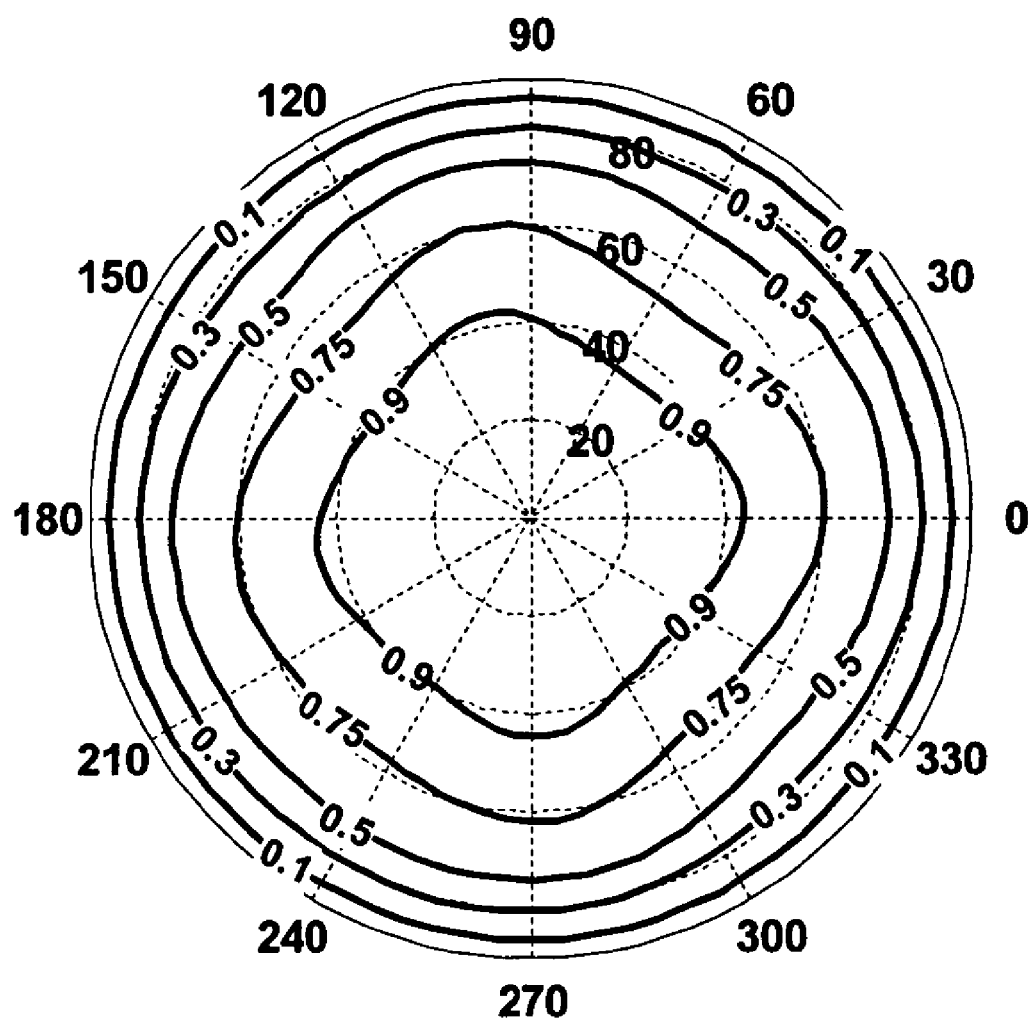
FIG. 8d is the simulated iso-brightness plot of the high transmittance and wide viewing angle LCD structure shown in FIG. 4a with a negative dielectric anisotropic liquid crystal material.

Unlike the IPS cell, the structures of the present invention have greatly enhanced the iso-brightness performance as shown in FIGS. 8c and 8d. The structures with positive liquid crystal material have expanded the greater than 75% transmittance cone to approximately 40 degrees at all azimuthal angles as shown in FIG. 8c. With negative liquid crystal materials have expanded the greater than 75% transmittance cone to approximately 50 degrees at all azimuthal angles as shown in FIG. 8d. Moreover, the greater than 90% transmittance cone in FIG. 8d (negative material) even reaches a viewing cone of approximately 38 degrees at all azimuthal angles, which is a wider viewing cone than achieved with the TN cell.

Figure 9A:
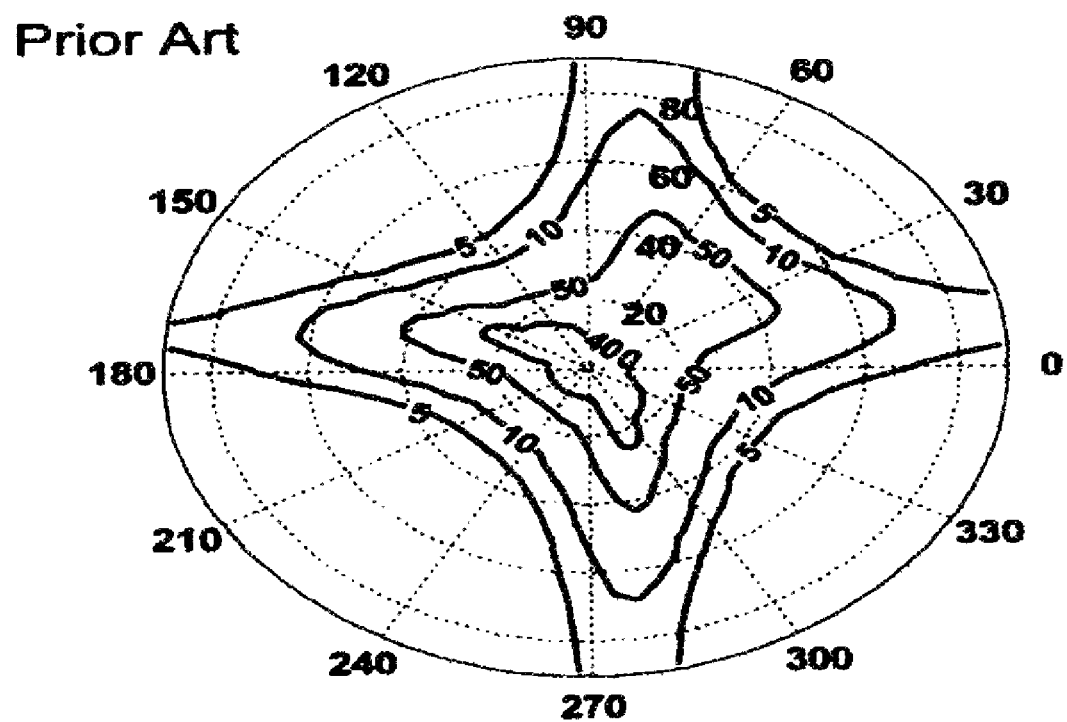
FIG. 9a shows the simulated iso-contrast plot of a prior art TN cell without compensation films.
Figure 9B:
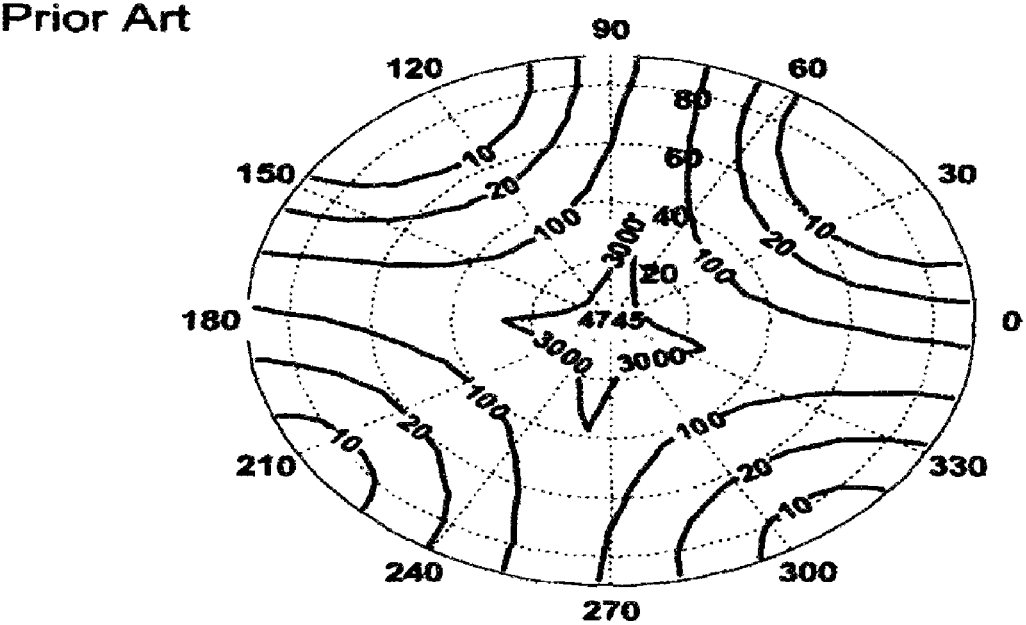
FIG. 9b shows the simulated iso-contrast plot of prior art IPS mode with transparent electrodes as shown in FIG. 1b without compensation films.
Figure 9C:
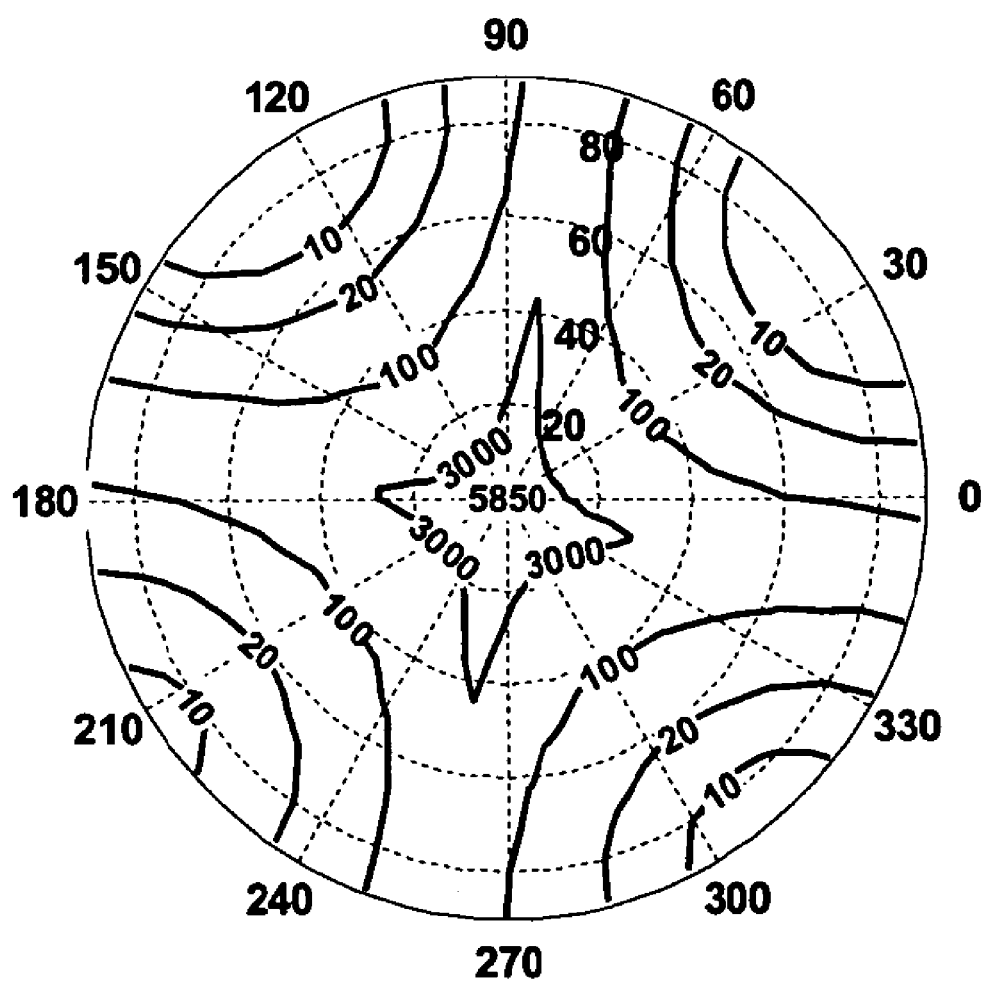
FIG. 9c shows the simulated iso-contrast plot of the high transmittance and wide viewing angle LCD structure shown in FIG. 4a using a positive dielectric anisotropic liquid crystal material without compensation films.
Figure 9D:
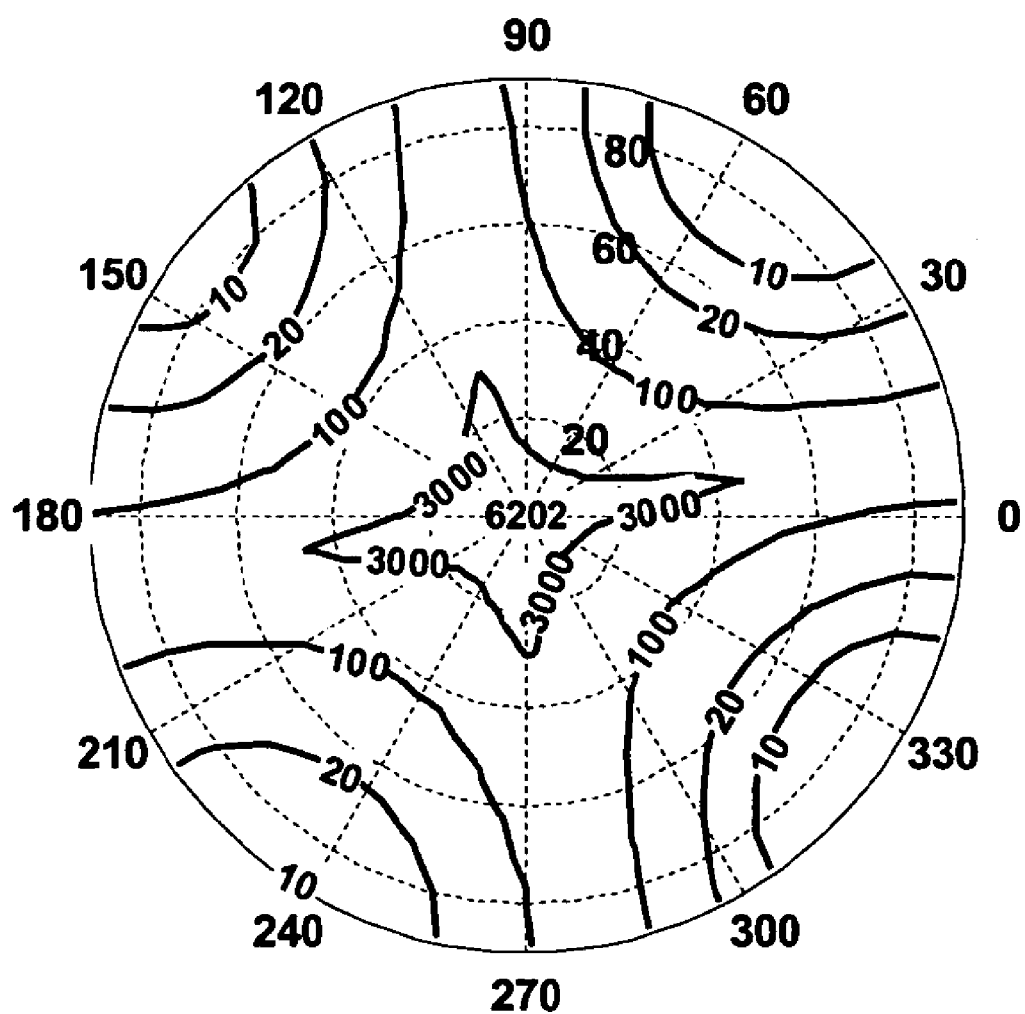
FIG. 9d is the simulated iso-contrast plot of the high transmittance and wide viewing angle LCD structure shown in FIG. 4a using a negative dielectric anisotropic liquid crystal material without compensation films.

FIGS. 9a through 9d show the iso-contrast plot of the conventional TN cell, the conventional IPS cell in FIG. 1b, the LCD cell of the present invention with positive liquid crystal material, and with negative liquid crystal material respectively without use of compensation films. Since the liquid crystal directors in a TN cell are aligned parallel to one substrate but nearly aligned perpendicularly to the other substrate, the contrast ratio are strongly angular dependent as shown in FIG. 9a. The butterfly shaped iso-contrast plot shows a very narrow viewing angle. FIG. 9B shows the iso-contrast plot for a conventional IPS cell without compensation films. Because the IPS cell directors are initially aligned parallel to the substrate, the viewing angle is less azimuthally dependent and wider.

The liquid crystal directors of the present invention in their dark states or voltage-off states, are also initially aligned parallel to the substrates, i.e., the viewing angle is also less azimuthally dependent. However, the liquid crystal display devices of the present invention achieve a higher transmittance than the conventional IPS mode. Similarly, the liquid crystal display devices of the present invention have a wider viewing angle, especially in the cone close to the center as shown in the iso-contrast plots shown in FIGS. 9c and 9d.

In summary, the structures of the present invention attain a comparable iso-brightness performance as the conventional TN cell. Both positive and negative liquid crystal material are used to reach a high greater than 90% transmittance of a conventional TN cell. At the same time these LCD devices of the present invention have wide viewing angle that is better than the viewing angle of the conventional IPS modes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:
1. A liquid crystal display device comprising:
a first substrate and a second substrate having plural pixels defined between the first and the second substrate;
a first and a second polarizing layer on an exterior surface of the first and the second substrate, respectively;
a first and a second alignment layer on an inner surface of the first and the second substrate, respectively;
a liquid crystal layer sandwiched between the first and second alignment layer, the liquid crystal layer treated so that liquid crystal molecules are aligned parallel to the surfaces of the first and second substrate in the absence of applied electric fields; and
each of the plural pixels comprising:
a first group and second group of electrodes each having at least one common electrode and at least one pixel electrode formed on the inner surface of the same one of the first and the second substrates;
an insulating layer formed between the pixel and the common electrode in each group; and
a thin-film transistor formed on the same substrate having the pixel electrode and the common electrode; and
wherein the common electrode is formed above the pixel electrode in the first electrode group and the pixel electrode is formed above the common electrode in the send electrode group generating electric fields containing both horizontal field components and vertical electric field components that dominate within the regions above and below the first and second group of electrodes and generating electric fields having horizontal field components and vertical field components that are weaker than the horizontal field components within the regions of the liquid crystal layer between the first and second group of electrodes.

2. The liquid crystal display device of claim 1, wherein the first group of electrodes comprises:
   a first and a second common electrode; and
   a first pixel electrode located between the first and second common electrode, wherein the first and second common electrodes have a width in the range of approximately 0.1 to approximately 0.95 times of the thickness of the liquid crystal layer, the first pixel electrode has a width in the range of approximately 0.1 to approximately 0.75 times of the thickness of the liquid crystal layer, and the distance between the first pixel electrode and each of the first and second common electrodes is less than a liquid crystal layer cell gap.

3. The liquid crystal display device of claim 1, wherein the second group of electrodes comprises:
   a second and third pixel electrode; and
   a third common electrode located between the second and third pixel electrodes, wherein the second and third pixel electrodes have a width in the range of approximately 0.1 to approximately 0.95 times of the thickness of the liquid crystal layer, the third common electrode has a width in the range of approximately 0.1 to approximately 0.75 times of the thickness of the liquid crystal layer, and the distance between the third common electrode and each of the second and third pixel electrodes is less than a cell gap of the liquid crystal layer.

4. The liquid crystal display device of claim 1, wherein the horizontal spacing distance between the first and second group of electrodes is greater than the thickness of the liquid crystal layer.

5. The liquid crystal display of claim 1, wherein the liquid crystal layer comprises:
   a positive liquid crystal material with a dielectric anisotropy greater than zero and a rubbing direction between approximately 45 degrees and approximately 90 degrees away from the direction of the generated horizontal electric field, wherein the product of the thickness of the liquid crystal layer and a refractive index anisotropy of the liquid crystal layer is within a range of approximately 0.25 and approximately 0.75 micrometers.

6. The liquid crystal display of claim 1, wherein the liquid crystal layer comprises:
   a negative liquid crystal material with a dielectric anisotropy greater than zero and a rubbing direction between approximately 0 degrees and approximately 45 degrees away from the x-axis, wherein the product of the thickness of the liquid crystal layer and a refractive index anisotropy of the liquid crystal layer is within a range of approximately 0.25 and approximately 0.75 micrometers.

7. The liquid crystal display device of claim 1, further comprising:
   an insulating layer between the one of the first and second alignment layers and the corresponding one of the first and the second substrate on which the first and the second group of electrodes are formed.

8. The liquid crystal layer of claim 7, wherein the first and the second group of electrodes comprises:
   a first and second common electrode formed on the insulating layer;
   a first pixel electrode formed on the one of the first and the second substrate below the first and the second common electrode, wherein the first and second common electrode and the first pixel electrode form the first set of electrodes and the width of the first and second common electrode and the pixel electrode is less than a cell gap of the liquid crystal layer;
   a second and third pixel electrode formed on the one of the first and second substrate; and
   a third common electrode formed insulating layer below the second and third common electrode, wherein the second and third pixel electrode and the third common electrode form the second set of electrodes and the width of the second and third pixel electrode and the third common electrode is less than a cell gap of the liquid crystal layer.

9. The liquid crystal display device of claim 8, wherein the width of the first pixel electrode and the third common electrode are each less than the distance between the first and second common electrode and the second and third pixel electrode, respectively.

10. The liquid crystal display device of claim 8, wherein the width of the first pixel electrode and the third common electrode are each greater than the distance between the first and second common electrode and the second and third pixel electrode, respectively.

11. The liquid crystal device of claim 10, further comprising:
    at least one compensation film located between one of the first and the second polarizing layer and the corresponding one of the first and second substrate to improve the viewing angle of the liquid crystal display.

12. The liquid crystal display of claim 11, wherein the at least one compensation film comprises:
    a first and a second uniaxial film to compensate the dark state of the liquid crystal display device.

13. The liquid crystal display of claim 11, wherein the first and a second uniaxial film comprises:
    a positive c-plate film having a product of its thickness and its refractive index anisotropy is between approximately 0.085 to approximately 0.095 micrometers; and
    a positive a-plate film having a product of its thickness and its refractive index anisotropy is between approximately 0.13 to approximately 0.15 micrometers and an optical axis that coincides with the rubbing direction of the liquid crystal.

14. The liquid crystal display of claim 11, wherein the at least one compensation film comprises:
    a biaxial film to reduce the light leakage at large viewing angles in voltage off state.

15. The liquid crystal display of claim 7, wherein the liquid crystal layer comprises:
    a positive liquid crystal material with a dielectric anisotropy greater than zero and has a rubbing direction between approximately 45 degrees and approximately 90 degrees away from the x-axis, wherein the product of the thickness of the liquid crystal layer and a refractive index anisotropy of the liquid crystal layer is within a range of approximately 0.25 and approximately 0.75 micrometers.

16. The liquid crystal display of claim 7, wherein the liquid crystal layer comprises:
    a negative liquid crystal material with a dielectric anisotropy greater than zero and has a rubbing direction between approximately 0 degrees and approximately 45 degrees away from the x-axis, wherein the product of the thickness of the liquid crystal layer and a refractive index anisotropy of the liquid crystal layer is within a range of approximately 0.25 and approximately 0.75 micrometers.

17. The liquid crystal display device of claim 1, wherein the liquid crystal molecules contacting the first alignment layer on the first substrate and the second alignment layer on the second substrate form a pretilt angle with respect to the surfaces of the first and the second substrates in a range of approximately 0.5 degree to approximately 10 degrees.

18. The liquid crystal display device of claim 1, wherein the first and second alignment layer rubbed anti-parallel to each other.

19. The liquid crystal display device of claim 1, wherein the first and second alignment layer are rubbed parallel to each other.

20. A method for producing a liquid crystal display device with high transmittance and wide viewing angle comprising the steps of:
    providing a first and a second substrate, wherein a plurality of pixels are defined between the first substrate and the second substrate;
    forming a first group of transparent electrodes having a common electrode formed above a pixel electrodes on the inner surface of one of the first and the second substrates;
    forming a second group of transparent electrodes having a common electrode formed below a pixel electrodes on the inner surface of the same one of the first and the second substrates adjacent to said first group of transparent electrodes, the first and second group separated by a distance that is greater than the liquid crystal cell gap, wherein each of the plural pixels include a first and a second group of transparent electrodes;
    layering a first and second alignment layer on an inner surface of the first and second substrate, respectively;
    depositing a liquid crystal layer having the cell gap d between the first and the second alignment layers; and
    connecting the at least one common electrodes in the first and the second group of transparent electrodes;
    connecting the at least one pixel electrode from the first and the second group of transparent electrodes together;
    connecting a thin-film transistor switch to the first and second group of transparent electrodes in each of said plural pixels; and
    generating electric fields containing both horizontal field components and vertical field components that dominate within the regions above and below the first and second groups of repetitively patterned electrodes; and
    generating a substantially horizontal electric field components and a vertical electric field components that are weaker than the horizontal field components within the regions of the liquid crystal layer between the first group of repetitively patterned electrodes and the second group of repetitively patterned electrodes.

21. The method of claim 20, further comprising:
    providing an insulating layer between the one of the first and the second substrate and the corresponding one of the first and second alignment layer having the first and the second group of electrodes,
    forming the at least one pixel electrode of the first and second group of transparent electrodes is formed on the one of the first and second substrate; and
    forming the at least one common electrode of the first and second group of transparent electrodes on the insulating layer.

22. The method of claim 21, further comprising the step of:
    layering at least one phase retardation film between the one of the first and second substrate and the corresponding one of the first and second polarizer to improve the viewing angle of the liquid crystal display device.

23. The method of claim 22, wherein the step of layering at least one phase retardation film comprises the step of:
    providing at least one uniaxial layer between the one of the first and second substrate and the corresponding one of the first and second polarizer.

24. The method of claim 22, wherein the step of layering at least one phase retardation film comprises the step of:
    providing at least one biaxial layer between the one of the first and second substrate and the corresponding one of the first and second polarizer.

* * * * *